United States Patent [19]

Scheu et al.

[11] Patent Number: 5,664,033

[45] Date of Patent: Sep. 2, 1997

[54] REMOTE FIBER TEST SYSTEM USING A NON-BLOCKING N×N MECHANICAL FIBER OPTICAL SWITCH

[75] Inventors: Friedrich Scheu, Hawthorn Woods, Ill.; Duwayne R. Anderson, Redmond, Oreg.; William K. Bucher, Portland, Oreg.; Steve U. Reinhold, Redmond, Oreg.; Lorimer L. Twigg, Sisters, Oreg.; Mark D. Marineau, Redmond, Oreg.

[73] Assignee: Tektronix, Inc., Wilsonville, Oreg.

[21] Appl. No.: 509,262

[22] Filed: Jul. 31, 1995

Related U.S. Application Data

[63] Continuation-in-part of Ser. No. 484,222, Jun. 6, 1995, Pat. No. 5,559,909, which is a continuation-in-part of Ser. No. 393,582, Feb. 23, 1995, abandoned, which is a continuation-in-part of Ser. No. 223,298, Apr. 5, 1994, Pat. No. 5,438,638.

[51] Int. Cl.⁶ ..................... G02B 6/26
[52] U.S. Cl. ............. 385/16; 385/67; 385/20
[58] Field of Search ............. 385/15–21, 25, 385/26, 67, 65

[56] References Cited

U.S. PATENT DOCUMENTS

| | | | |
|---|---|---|---|
| 3,800,388 | 4/1974 | Borner et al. | 29/200 |
| 4,239,333 | 12/1980 | Dakss et al. | 350/96.21 |
| 4,401,365 | 8/1983 | Mizokawa et al. | 350/96.2 |
| 4,875,772 | 10/1989 | Gentile | 356/73.1 |
| 4,896,935 | 1/1990 | Lee | 350/96.2 |
| 4,953,932 | 9/1990 | Mihich | 350/96.15 |
| 4,955,976 | 9/1990 | Freeman et al. | 350/96.21 |
| 5,031,994 | 7/1991 | Emmons | 350/96.2 |
| 5,037,176 | 8/1991 | Roberts et al. | 385/16 |
| 5,123,219 | 6/1992 | Beard et al. | 51/283 |
| 5,241,409 | 8/1993 | Hill et al. | 359/128 |
| 5,317,439 | 5/1994 | Fatehi et al. | 359/110 |
| 5,325,089 | 6/1994 | Goeldner | 340/825.8 |
| 5,325,090 | 6/1994 | Goeldner | 340/825.8 |
| 5,383,015 | 1/1995 | Grimes | 356/73.1 |
| 5,408,093 | 4/1995 | Ito et al. | 250/227.26 |
| 5,463,704 | 10/1995 | Ziebol | 385/22 |

OTHER PUBLICATIONS

"*Strictly Nonblocking 512×512 Optical Fiber Matrix Switch Based on Three-Stage Clos Network*", Tachikura et al, IEEE Photonics Technology Letters, vol. No. 6 Jun. 1994.

*Primary Examiner*—John Ngo
*Attorney, Agent, or Firm*—William K. Bucher

[57] ABSTRACT

An remote fiber test system includes a non-blocking N×N optical switch having N input ports and N output ports with one of the input ports coupled to a measurement test instrument for examining any of the optical fibers coupled to the output ports. The non-blocking switch includes a plurality of N input mechanical optical switches and an plurality of N output mechanical optical switches with each of the input mechanical optical switches having an input optical transmission path representing one of the input ports and each of the output mechanical optical switches having an output optical transmission path representing one of the output ports. Each input mechanical optical switch has N output optical transmission paths which each optical transmission path being coupled to one of the input optical transmission paths of each of the output mechanical optical switches. Each output mechanical optical switch has N input optical transmission paths with each optical transmission path being coupled to one of the output optical transmission paths of each input mechanical optical switch. Interconnecting optical transmission paths may be used to couple the N output optical transmission paths of the input mechanical optical switches with the input optical transmission paths of the output mechanical optical switches.

43 Claims, 21 Drawing Sheets

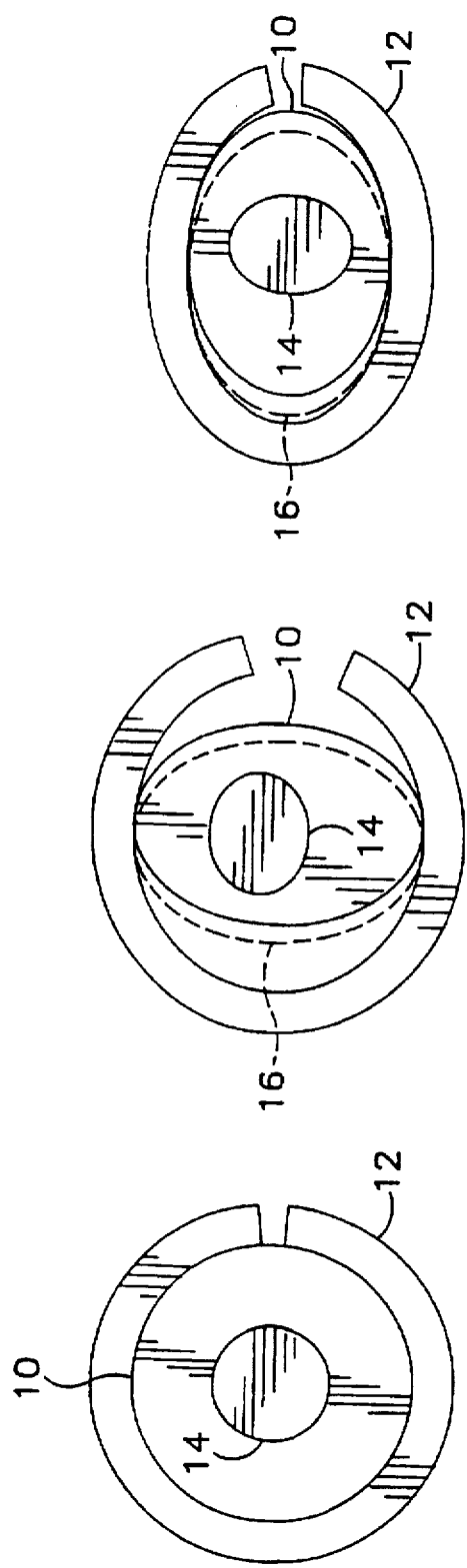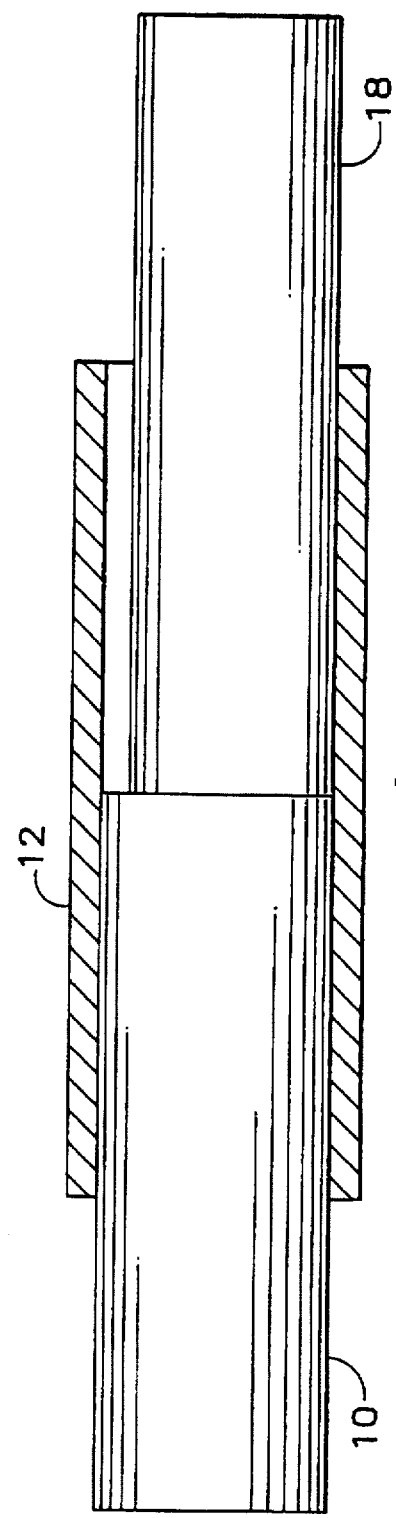

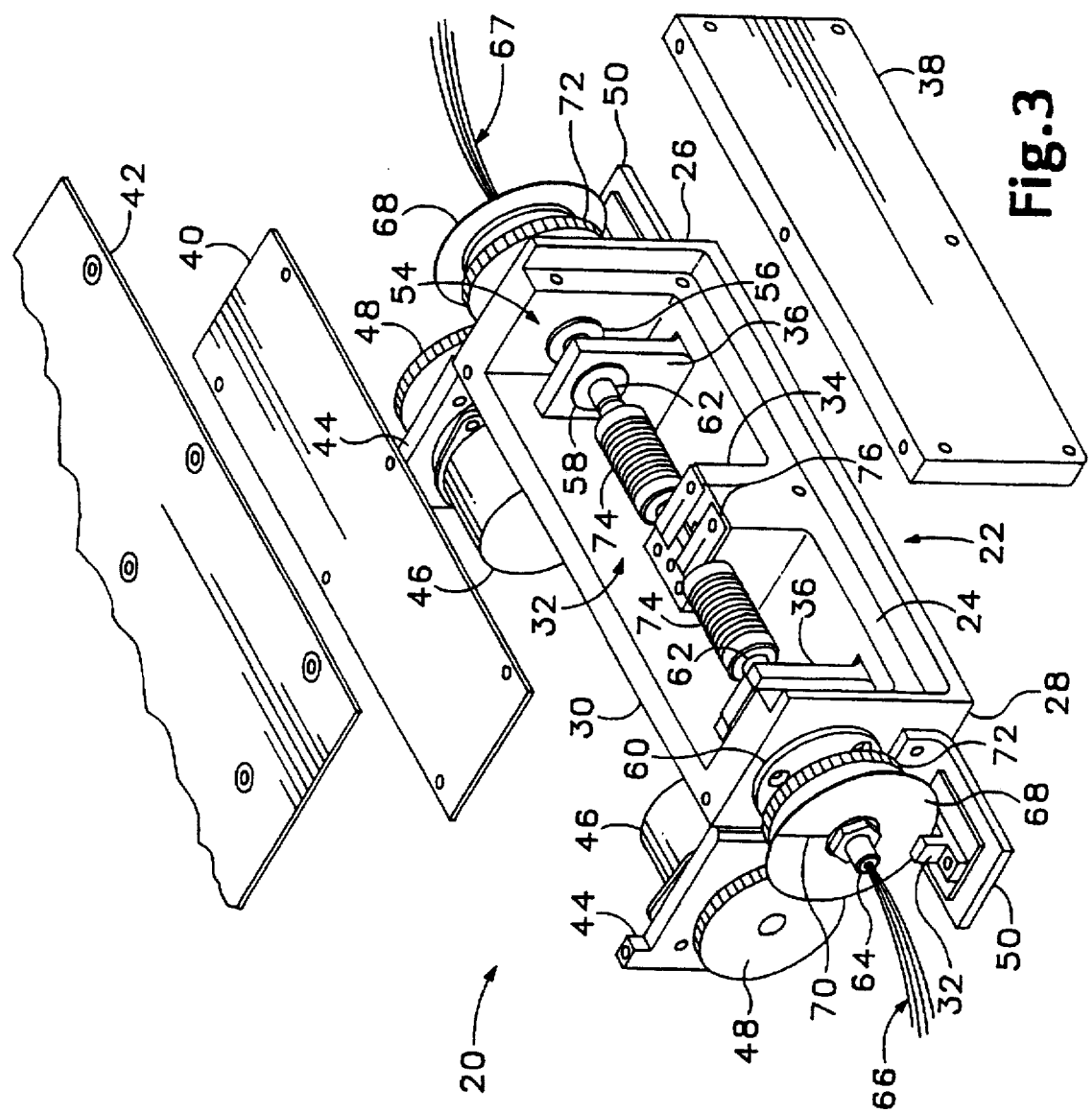

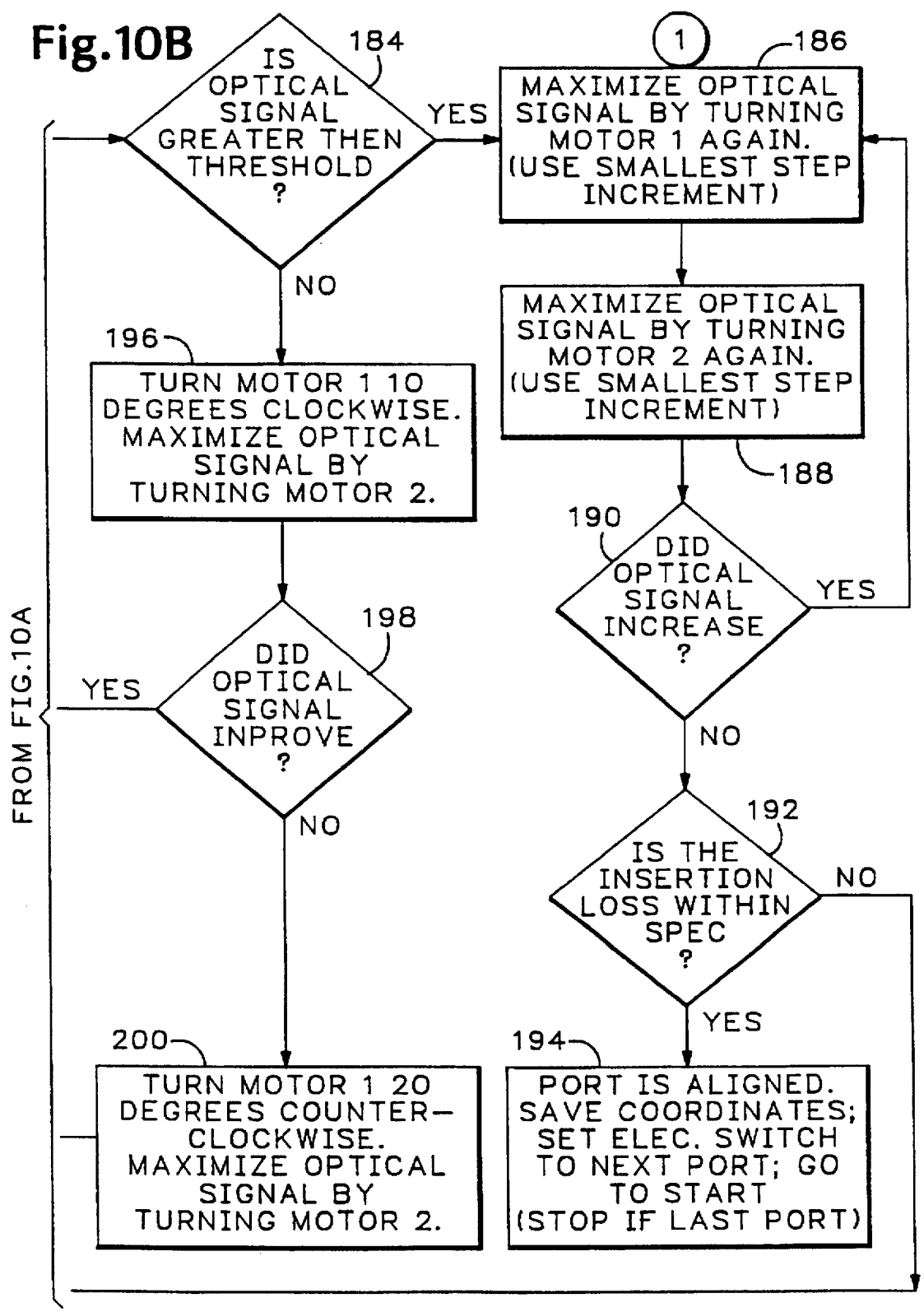

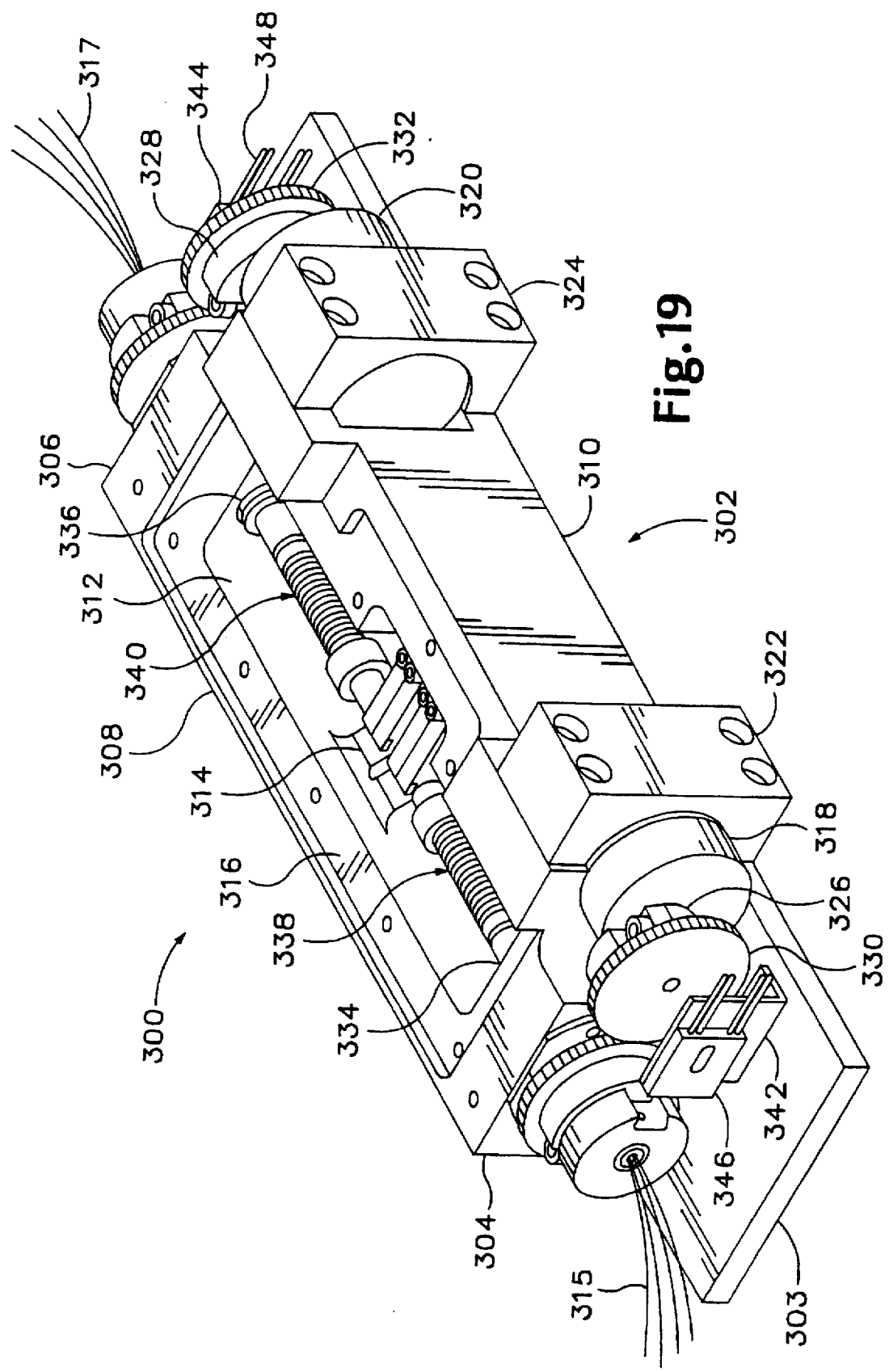

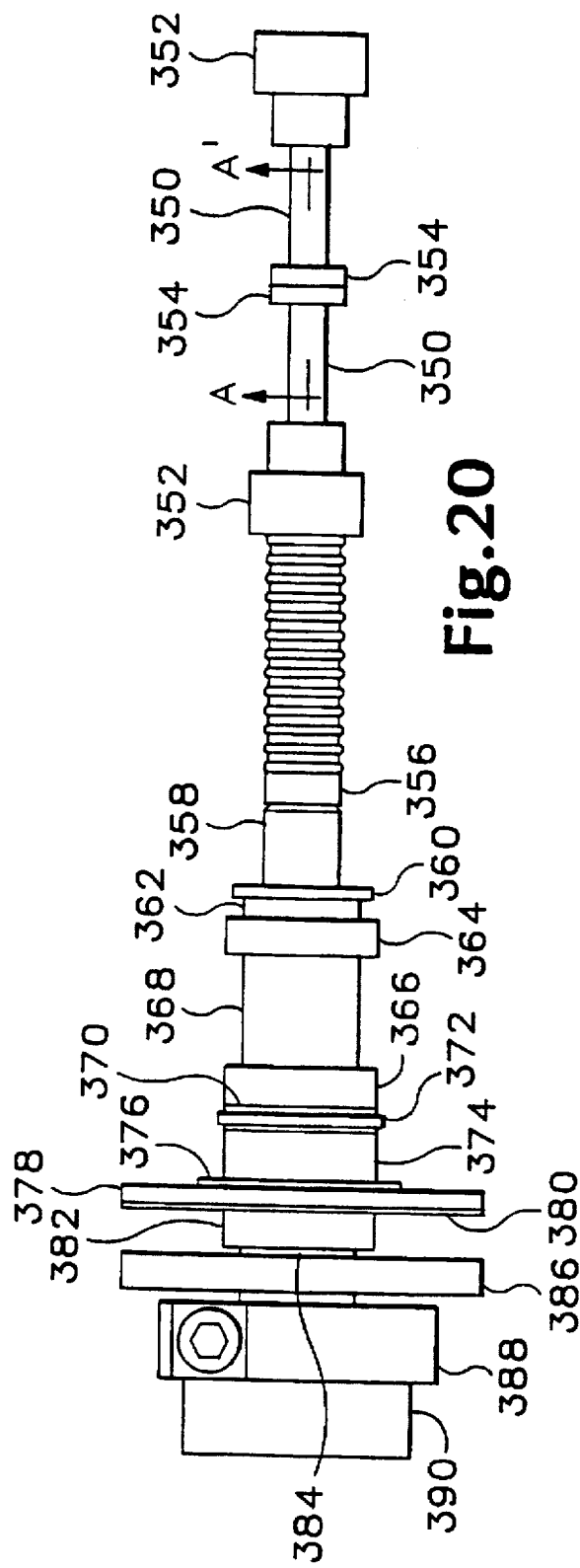
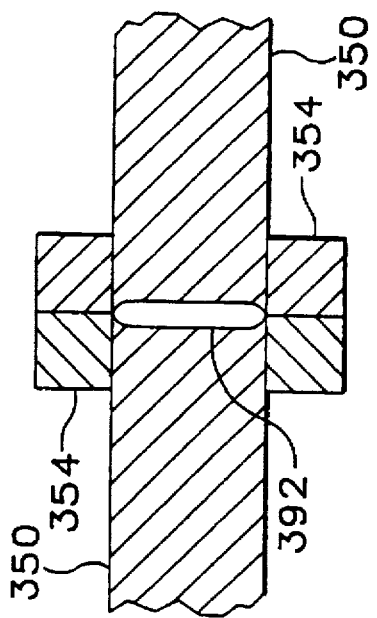
Fig.20
Fig.21

REMOTE FIBER TEST SYSTEM USING A NON-BLOCKING N×N MECHANICAL FIBER OPTICAL SWITCH

This is a continuation-in-part application of continuation-in-part application Ser. No. 08/484,222, filed on Jun. 6, 1995, now U.S. Pat. No. 5,559,909, which is a continuation-in-part application of continuation-in-part application Ser. No. 08/393,582, filed on Feb. 23, 1995, abandoned, which is a continuation-in-part application of application Ser. No. 08/223,298, filed on Apr. 5, 1994, now U.S. Pat. No. 5,438,638.

BACKGROUND OF THE INVENTION

The present invention relates generally to remote fiber test systems and more specifically to a remote fiber test system having at least one non-blocking mechanical optical switch having rotatable mechanical optical switches for selectively connecting any of the switch input ports to any of the switch output ports for rotatably coupling a measurement test instrument connected to an input port to optical fibers coupled to the output ports There are generally two types of optical switches in use today: electronic optical switches and mechanical optical switches. Electronic optical switches may be characterized as having no moving parts and perform the switching function, for example, by acousto-optically or electro-optically diverting the light passing through the switch.

Mechanical optical switches, on the other hand, physically move optical fiber elements to produce the switching function. Generally the physical movement of the optical fibers in mechanical optical switches is either transversal or rotational. One family of mechanical optical switches uses focusing elements, such as lenses or the like, to focus the light from one fiber to another. The use of such elements increases the translational tolerances of the switch but substantially decreases its angular tolerances and increases its cost. The other family of mechanical optical switches directly couple the light from one optical fiber to the other. The optical fibers are positioned in opposing relationship with the end faces of the optical fibers in substantially abutting relationship with each other. While this design eliminates the focusing elements and increases the angular tolerances, it substantially decreases the translational tolerance of the switch.

U.S. Pat. No. 5,383,015 describes an apparatus and method for obtaining optical time domain reflectometry measurements on a multi-branch optical network. Each optical subcircuit on the network contains an optical filter that selectively passes curtain optical wavelengths. An optical time domain reflectometer (OTDR), capable of generating optical pulses at different optical wavelengths, is connected to the network. To test a specific optical subcircuit, the OTDR generates optical pulses at an optical wavelength that is transmitted by the optical filter in one of the optical subcircuits but is blocked by the optical filter in the other optical subcircuit. Conversely, to test the other optical subcircuit, the OTDR generates optical pulse at an optical wave length that is transmitted through the optical filter of the other optical subcircuit and blocked by the optical filter in the first optical subcircuit.

U.S. Pat. No. 4,875,772 describes remotely controlled optical time domain reflectometer serving a plurality of fiber optic cables where the OTDR is connected to the fiber optic cables through directional couplers and wavelength division multiplexers or wavelength independent couplers. The OTDR is also equipped with two laser sources operating at different wavelengths. The wavelength division multiplexer (or the wavelength dependent coupler) changes the ratio of the light exiting its output ports as a function of the wavelength of the light. If 1300 nm wavelength light is travelling into Port 1, then 99% of it will exit from Port 3, and only 1% will exit Port 4. If the wavelength is changed to 1550 nm, then approximately 99% will be emitted from Port 4 and only 1% from Port 3. These properties are reciprocal when light travels in the opposite direction. The separate laser source are coupled to respective directional or WIC couplers. The output of the couplers are coupled to respective optical fibers. The directional or WIC couplers are also coupled to a WDM or WIC coupler which is connected to an optical detector. One laser source is used for testing one of the optical fibers and the other laser is used for testing the other optical fiber. This reference specifically states that remotely controlled fiber optic switches could be used, but these are nearly as costly as the OTDRs. The reference further states that fiber optic switches have the additional disadvantage that they cause relatively high signal loss.

U.S. Pat. No. 4,401,365 describes a rotary-type optical switch in which a pair of opposing optical transmission path mounting members are disposed on the same rotational axis. One mounting member may be fixedly secured in a casing while the other member rotates on a central shaft. Alternately, the shaft may be fixed with one of the mounting members rotating about the shaft. The shaft or the mounting member is directly connected to a motor so that one mounting member is rotatable with respect to the other as the shaft or mounting member is rotated by the motor. The mounting members have respective plane surfaces which are closely opposite each other. Optical fibers are secured in each mounting member such that the end faces of the optical fibers in each mounting member are concentric about the rotational axis of the mounting member and lie on respective phantom circles having the same radii.

U.S. Pat. No. 5,037,176 describes another rotary-type optical switch that includes first and second identical arrays of optical fibers held in axial alignment and relatively rotatable about an axis of rotation to effect optical coupling and decoupling of fibers in the opposing arrays. The optical switch has cylindrical switch bodies that receive the first and second identical arrays of optical fibers. The switch bodies are maintained in coaxial alignment by means of a split sleeve coupler. A tube surrounds the sleeve containing the fiber arrays and O-rings may be disposed between the sleeve and the tube to permit an index matching fluid to be retained within the switch to prevent back reflections. The optical switch described in the "176 patent is incorporated into an optical switch assembly described in U.S. Pat. No. 5,031,994.

A critical factor in mechanical fiber optical switches (MFOS) is the precise alignment of the opposing optical fibers in the switch. Currently, this requires the components of the switch to be made to very precise tolerances along with exacting manufacturing processes. As will be described below, current MFOS fall short in cycle-to-cycle repeatability, long-term repeatability and absolute alignment of the opposing optical fibers.

Mechanical fiber optic switches have unique bearing requirements that are not found in other types of applications. These special requirements need to be examined to understand why current MFOS do not provide the optimum alignment between switching fibers. The alignment tolerances for light coupling between single-mode optical fibers is well known and need not be discussed in detail here.

Assuming no longitudinal or fit misalignment and the input and output fibers are identical, the fractional coupling transmission for optical fibers with lateral misalignment is $$T = \exp\left\{ -\frac{x^2}{w^2} \right\} \quad [1]$$

where x is the lateral offset and w is the $1/e^2$ radius of the irradiance pattern of the fundamental mode of the optical fiber. The derivative of equation [1] is taken to obtain the change in loss for a given change in coupling efficiency.

$$\Delta T = -\frac{2x}{w^2} \cdot \Delta x \cdot \exp\left\{ -\frac{x^2}{w^2} \right\} \quad [2]$$

Equation [2] can be rearranged to solve for $\Delta x$ as a function of the lateral offset, radius of the fundamental fiber mode, and the change in loss. The result is $$\Delta x = -\frac{w^2}{2x} \cdot \Delta T \cdot \exp\left\{ \frac{-x^2}{w^2} \right\} \quad [3]$$

Using the above equations and assuming a transmission efficiency of the switch must be repeatable within 0.01 dB on a cycle-to-cycle basis with a nominal transmission loss of less than 0.50 dB, maximum alignment tolerance values can be calculated for cycle-to-cycle repeatability, long-term repeatability, and absolute alignment. Since the $1/e^2$ radius of the fundamental mode in standard single-mode fiber is roughly 5.0 microns, the nominal loss of 0.50 dB corresponds to a lateral misalignment of approximately 1.7 microns (according to equation [1]). According to equation [3], if the transmission changes less than 0.01 dB on a cycle-to-cycle basis, the misalignment of 1.7 microns must be repeated to within 0.015 microns, or 15 nanometers. The numerical tolerance are calculated for an optical fiber having a mode field diameter of 5.0 microns. Other optical fiber may, for example, have mode filed diameters, such as 5.1 or 5.6 microns. Different mode field diameters will change the numerical tolerances slightly but not substantially. The 0.015 micron requirement is for cycle-to-cycle repeatability only. There is also a long term repeatability requirement where the transmission efficiency must not change by more than 0.10 dB over about 100,000 cycles. Applying the same analysis using equations [1] and [3], the position accuracy of the opposing fibers in the switch must repeat to within 0.15 microns on a long-term basis or about ¼th of a wavelength of visible light.

Referring now to FIG. 1A, there is shown an end view of a cylindrical shaft 10 inside a split sleeve 12. In an ideal world, the shaft 10 is perfectly round and has exactly the same outside diameter as the equally perfectly round inside diameter of the split sleeve 12 with the shaft 10 touching the split sleeve 12 along its entire circumference. A bore 14 formed in the shaft 10 for holding the optical fibers is perfectly round and concentric with the shaft 10 and split sleeve 12. FIGS. 1B and 1C illustrate on an exaggerated scale the type of shaft 10, split sleeve 12, and bore 14 that can be expected in the real, imperfect world. None of the elements 10, 12, or 14 will be perfectly round. Instead, shaft 10 and split sleeve 12 will approximate a cylindrical surface, with local regions where the radius is slightly too large, or too small. This is shown in the figures as an ellipse. As can be seen from the figures, the points of contact between the split sleeve 12 and the shaft 10 will change as one or the other rotates, or if any slight lateral torque, as shown by dashed ellipse 16, is applied to the shaft 10, so that fibers (not shown) in the shaft will not trace out concentric circles. Notice also that, at the point of contact, the surface of the split sleeve 12 is tangent to the surface of the shaft 10. The only predominant force preventing the shaft 10 from slipping in the split sleeve 12 is the frictional force between the two surfaces. The frictional force is incapable of reliably providing the kind of cycle-to-cycle or long-term repeatability that is needed. Furthermore, there is the paradox of lubrication. In order to extend the life of the bearing surfaces it is desirable to lubricate them, but lubrication reduces the frictional forces between the two surfaces, resulting in more wobble.

FIGS. 1B and 1C illustrate an additional problem. The fibers align themselves to the shaft 10 via the bore 14 drilled along the axis of the shaft 10, and this bore 14 has its own set of tolerances. Specifically, the bore 14 will be slightly out of concentricity with the outside surface of the shaft 10, and like the outside surface of the shaft 10, it will be slightly out-of-round.

There are multiple dimensional tolerances that must be tightly specified if the input and output fibers of the switch are to rotate on identical circles that are precisely concentric. The design parameters that must be firmly controlled are:
Roundness of the input shaft outside diameter.
Roundness of the output shaft outside diameter.
Roundness of the input shaft inside diameter.
Roundness of the output shaft inside diameter.
Concentricity of the input shaft inside and outside diameters.
Concentricity of the output shaft inside and outside diameters.
Outside diameter of the input shaft.
Inside diameter of the input shaft.
Outside diameter of the output shaft.
Inside diameter of the output shaft.
Inside diameter of the split sleeve.
Roundness of the split sleeve inside diameter.
Diameters of the input and output fibers.
Concentricity of the input and output fibers.

To maintain an insertion loss of less than 0.50 dB, all of these tolerances must add up to less than about 0.17 microns of misalignment. This is an extremely difficult task, and to accomplish it the individual components (input fibers, output fibers, input shaft, output shaft, and split sleeve) must have several dimensional tolerances that are sub-micron. This is certainly not conducive for minimizing the costs of individual components, and is daunting in terms of manufacturability.

Another issue in mechanical fiber optic switch design is switch repeatability. Referring to FIG. 2, there is shown a side view of the shaft 10 and sleeve 12 of FIGS. 1B and 1C with the sleeve 12 being sectioned. The split sleeve 12 works with shaft 10 that is slightly larger than the inside diameter of the unexpanded sleeve 12. Because the sleeve 12 is split, it can expand slightly to allow the shaft 10 (a ferrule containing the optical fibers) to fit inside with no diametrical clearance. Diametrical clearance is unsatisfactory because it results in slop within the bearing, and there is needed less than 0.015 microns of misalignment non-repeatability between the opposing fibers to meet the cycle-to-cycle repeatability specifications. An additional important tolerance is the straightness of the ferrules.

As has been discussed with FIGS. 1B and 1C, the out of roundness on the part of the shaft 10 and the sleeve 12 will cause the fiber to move on curves that are not circles. However, barring wear in the bearing, out-of-roundness should not result in slop or lack of repeatability. Out-of-roundness will affect the total coupling efficiency, but not the repeatability. FIG. 2 shows the shaft 10 having an interference fit with the sleeve 12. However, a second shaft 18 will most likely have a slightly different diameter owing to the inevitable tolerances in manufacturing. If the second shaft 18 has a larger diameter than the first shaft 10, then it will expand the split sleeve 12 a little bit, resulting in an interference fit for the second shaft 18 but not the first shaft 10. Now the first shaft 10 can slop in the split sleeve 12. If the second shaft 18 has a smaller diameter than the first, then it will wobble. No matter what happens one of the two shafts 10 or 18 will wobble within the split sleeve 12. To meet the cycle-to-cycle repeatability requirement this wobble must be less that 0.015 microns, so the diameter of the two shafts 10 and 18 must be equal to about 0.008 microns. This specification would require extremely expensive parts. However, for all practical purposes, meeting such a specification would be impossible to do.

What is needed is an remote fiber test system having an inexpensive non-blocking fiber optic switch using a mechanical fiber optic switch that meets the cycle-to-cycle repeatability, long-term repeatability, and absolute misalignment specifications. Such a mechanical fiber optic switch for use in a remote fiber test system should use loosely toleranced commercially available off-the-shelf components and be easy to assemble without requiting fine alignment of the switch components and fibers. In addition, the switch should have a fiber mounting system that has minimum bearing wear and is insensitive to dimensional differences of the components. Further, the switch should have good stability over temperature. Further still, such a remote fiber test system should be capable of coupling multiple type of measurement test equipment to multiple optical fibers through the non-blocking optical switch.

SUMMARY OF THE INVENTION

Accordingly, the present invention is a remote fiber test system having at least a first measurement test instrument for testing optical fibers having a non-blocking N×N optical switch having N input ports and N output ports for selectively coupling any input port to any output port. One of the input ports is coupled to the measurement test instrument and the output ports are coupled to optical fibers. The non-blocking N×N optical switch includes a plurality of N input and N output mechanical optical switches with each input mechanical optical switch having an input optical transmission path representing one of the input ports of the non-blocking optical switch and N output optical transmission paths. Each output mechanical optical switch has N input optical transmission paths and an output optical transmission path representing one of the output ports of the non-blocking switch. Each of the mechanical optical switches has first and second independent and offset rotational axes about which the respective optical transmission paths rotate with the optical transmission paths being held in respective first and second mounting members axially aligned with the respective first and second independent and offset rotational axes with the respective optical transmission paths being positioned off of the respective rotational axes of the mounting members.

Each of the input mechanical optical switch has the input optical transmission path rotating about the first independent and offset rotational axis for positioning the input optical transmission path on a first closed curve. The N output optical transmission paths rotate about a second independent and offset rotational axis for positioning the output optical transmission paths on closed curves with the input optical transmission path and the output optical transmission paths being in opposing relationship forming an optical interface. The closed curve of the input optical transmission path is laterally offset from the closed curves of the output optical transmission paths for establishing intersecting points on the offset closed curves. Each optical transmission path of the output optical transmission paths is coupled to one of the N input optical transmission paths of each output mechanical optical switches.

Each of the output mechanical optical switches has the N input optical transmission paths rotating about the first independent and offset rotational axis for positioning the input optical transmission paths on first closed curves with each optical transmission path of the input optical transmission paths being coupled to one of the N output optical transmission paths of each input mechanical optical switches. The output optical transmission path rotates about the second independent and offset rotational axis for positioning the output optical transmission path on a closed curve with the input optical transmission paths and the output optical transmission path being in opposing relationship forming an optical interface. The closed curves of the input optical transmission paths are laterally offset from the closed curve of the output optical transmission path for establishing intersecting points on the offset closed curves.

The input and output mechanical optical switches each have means for storing angular coordinates representative of the intersecting points on the offset closed curves of their input and output optical transmission paths and each have means for axially aligning their input and output optical transmission paths at one of the intersecting points on the offset closed curves using drive motors coupled to their respective mounting members and responsive to the angular coordinates for selectively rotating their input and output optical transmission paths relative to each other about their respective independent and offset rotational axes.

The non-blocking N×N optical switch of the remote fiber test system further includes interconnecting optical transmission paths coupled between the N output optical transmission paths and N input optical transmission paths of the respective input and output mechanical optical switches. Optical connectors may be disposed on the N output optical transmission paths and N input optical transmission paths and the interconnecting optical transmission paths for ease in interconnecting the individual mechanical optical switches in the non-blocking switch. Optical connectors may also be disposed on the input and output optical transmission paths of the respective input and output mechanical optical switches for coupling optical fibers to the input and output optical transmission paths. The use of the optical connectors permits easy replacement of individual mechanical optical switches in the non-blocking switch.

The remote fiber test system according to the present invention may also be configured with at least one of the input mechanical optical switches of the non-blocking N×N optical switch having a plurality of optical transmission paths rotating about the first independent and offset rotational axis for positioning the input optical transmission paths on first closed curves with each optical transmission paths being coupled to measurement test instruments. The measurement test instruments may be an optical time domain reflectometer, optical power meter, SDH/SONET test set or the like. A second non-blocking N×N optical switch may be included in the remote fiber test system having N input ports and N output ports for selectively coupling any input port to any output port with one of the output ports coupled to another measurement test instrument and the input ports coupled to receive the optical fibers from the output ports of the first non-blocking optical switch.

The non-blocking N×N optical switch of the remote fiber test system according to the present invention may be configured with first and second switching stages having N inputs and $N^2$ outputs. The first switching stage has the plurality of N input mechanical optical switches with the input optical transmission paths of the input mechanical optical switches being coupled to N inputs of the first switching stage and the output optical transmission paths being coupled to the $N^2$ outputs of the first switching stage. The second switching stage has the plurality of N output mechanical optical switches with the input optical transmission paths of the output mechanical optical switches being coupled to the $N^2$ inputs of the second switching stage and output optical transmission paths being coupled to the N outputs of the second switching stage. The N inputs and N outputs of the respective first and second switching stages represent the input and output ports of the non-blocking N×N optical switch.

In still a further aspect of the invention, the mounting members of each mechanical optical switch of the non-blocking N×N optical switch are positioned in individual, kinematically designed offset holder assemblies. In the preferred embodiment, the kinematic mounts are V-groove structures having an apex and angularly extending sidewalls forming a V-shaped cavity for receiving the respective mounting members. A spring clamp is positioned over the V-shaped cavity for securing the mounting members in a three-point cavity. The V-groove structures are formed from a material having substantially the same or greater hardness and fracture toughness as the mounting members or have inserts secured to the sidewalls of the V-groove structures and the spring clamps that have substantially the same or greater hardness and fracture toughness as the mounting members. The mounting members and the V-groove structures are preferably a borosilicate or ceramic material. The inserts are preferably hard materials, such as ceramic.

In the preferred embodiment, the mounting members are first and second ferrules with each ferrule having a centrally disposed longitudinal axis about which the ferrule rotate, an outside diameter and a central bore for receiving the respective first and second optical fibers. The optical transmission paths, in the form of optical fibers, may completely fill the ferrules with any one optical fiber lying substantially on the rotational axes of the ferrules not moving on a closed curve. Further, the optical interface ends of the ferrules have a sleeve member of ceramic material, which when polished provide separation between the first and second optical fibers. Alternately, the ferrules may be made of a ceramic material having a greater hardness and fracture toughness than the interior optical fibers.

The axial aligning means includes means for selectively rotating the first and second optical transmission paths relative to each other about their respective independent and offset rotational axis. Means are provided for storing angular coordinates representative of the intersecting points of the first and second closed curves of the respective first and second optical transmission paths. The rotating means include first and second stepper motors or DC motors with high resolution encoders responsive to the angular coordinates of one of the intersecting points of the first and second closed curves for coupling rotational movement to the respective first and second optical transmission paths. First spur gears mounted to the respective stepper or DC motors transmit rotation movement to rotatable shafts via second spur gears mounted on the rotatable shafts. The rotatable shafts are coupled to the respective optical transmission path mounting members. The rotatable shafts include a first shaft element having a central bore for receiving the respective first and second optical transmission paths and a flexible drive shaft coupling for connecting the first drive shaft element to the respective optical transmission path mounting members. Also included are first and second bearings having a central bore for receiving the first shaft element of the rotatable drive shafts. Alternately, the rotating means may be first and second manually rotatable reduction gear assemblies coupled to transmit rotational movement to the respective first and second optical transmission paths.

The objects, advantages and novel features of the present invention are apparent from the following detailed description when read in conjunction with appended claims and attached drawings.

BRIEF DESCRIPTION OF THE DRAWINGS

FIGS. 1A–1C are respective idealized and real world representations of a prior art coaxial alignment scheme for a mechanical fiber optic switch.

FIG. 2 is a side view of the prior art coaxial alignment scheme for a mechanical fiber optic switch.

FIG. 3 is an exploded perspective view of the mechanical optical switch used in the non-blocking N×N optical switch of the remote fiber test system according to the present invention.

FIG. 19 is a perspective view of an improved mechanical optical switch used in the non-blocking N×N optical switch of the remote fiber test system according to the present invention.

FIG. 20 is a plan view of the mounting member drive line assembly of the improved mechanical optical switch used in the non-blocking N×N optical switch of the remote fiber test system according to the present invention.

FIG. 21 is a cross-section view along line A-A' of the mounting member of the improved mechanical optical switch used in the non-blocking N×N optical switch of the remote fiber test system according to the present invention.

DETAILED DESCRIPTION OF THE PREFERRED EMBODIMENT

Figure 4:
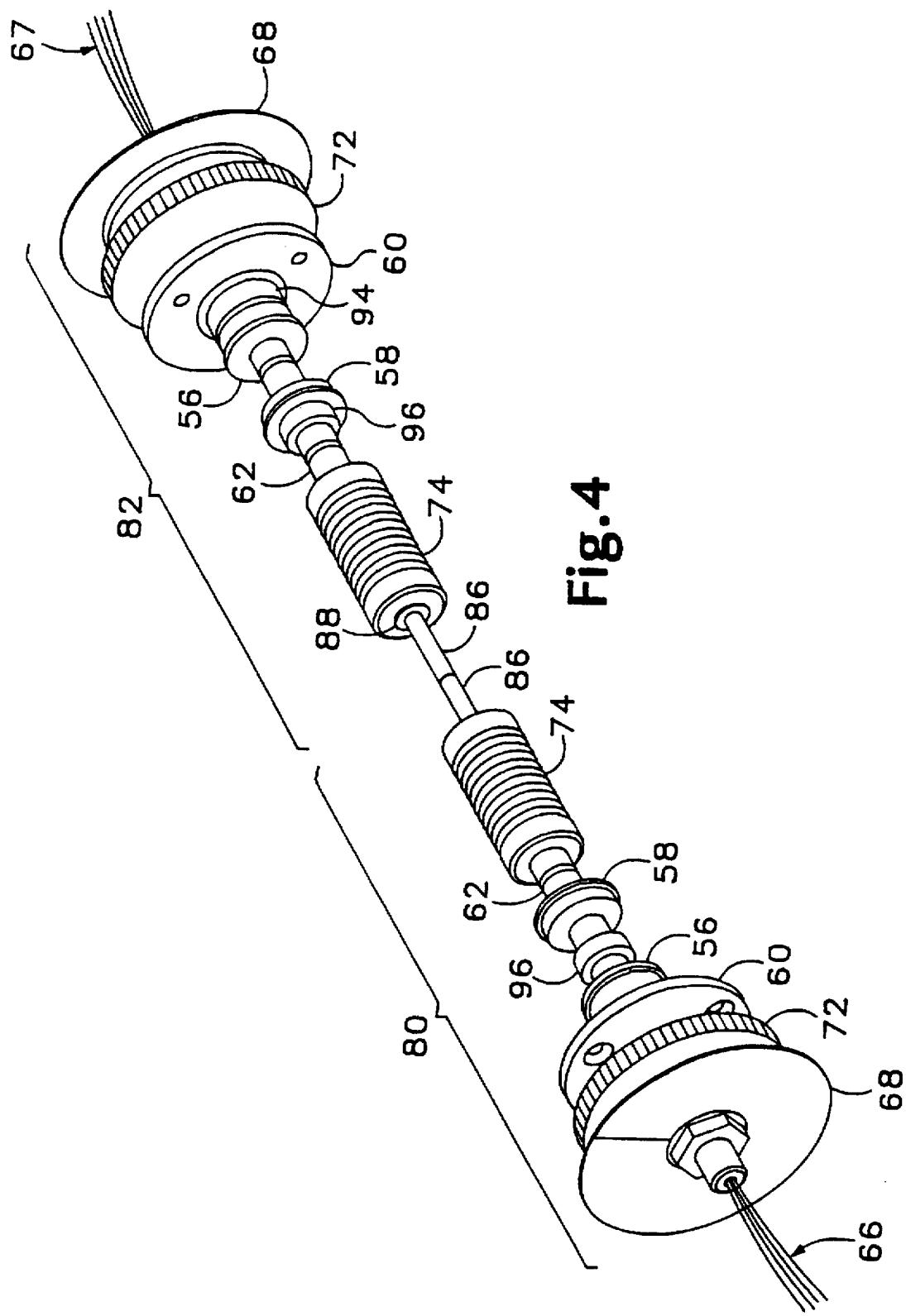
FIG. 4 is a perspective view of the ferrule drive assembly in the mechanical optical switch used in the non-blocking N×N optical switch of the remote fiber test system according to the present invention.

Referring to FIG. 3, there is shown an exploded perspective view of the mechanical optical switch 20 used in a non-blocking optical switch of the remote fiber test system according to the present invention. One use for non-blocking optical switches is in remote fiber test systems. In such a system, the non-blocking optical switch connects a remote measurement test instrument, such as an optical time domain reflectometer, optical power meter, or the like, to various optical fibers in order to evaluate them. Another use is in conjunction with central office telephone switches for redirecting phone signals to a different optical fiber line when the original line is damaged.

Switch 20 has a housing 22 having a base 24, end walls 26 and 28, and sidewall 30 forming a partial cavity 32. Within the cavity 32 is a central pedestal 34 and bearing supports 36 rising from the base 24. The bearing supports 36 are disposed between the central pedestal 34 and the end walls 26 and 28. A removable sidewall 38 and top plate 40 are provided for enclosing the housing cavity 32. Mounted on top of the housing 22 is a circuit board 42 containing the electronic circuitry for the switch 20. The electronic circuitry contains a storage device or devices for holding angular coordinates related to intersecting points on closed curves between two opposing optical fibers. It also contain logic circuitry for validating requests to and functions of the switch and for generating interrupt commands for stopping switch functions and user error codes. Secured to the outside of the housing 22 adjacent to the end walls 26 and 28 are stepper motor brackets 44. Secured to each bracket 44 is a stepper motor 46. Extending from each stepper motor 46 is a shaft on which is secured a toothed spur gear 48. Mounted on the outside of each end wall 26 and 28 is a photodetector bracket 50. Mounted on each bracket is a photodetector 52 having a light emitting element and a light sensitive element.

A bore 54 is formed in each of the end walls 26 and 28. Bearings 56 are press fit into each bore 54 from the cavity 32 side of the end walls 26 and 28. Beatings 58 are also press fit into the bearing supports 36. Flange shaft seals (not visible in this figure) are mounted within each bore 54 from the outside of the cavity 32 and held in place by seal plates 60 mounted on the outside of the end walls 26 and 28. Extending through the seal plates 60, the flange shaft seals, and bearings 56 and 58 are rotatable drive shafts 62 having a central bore 64 for receiving input and output optical fibers 66 and 67. Mounted on each drive shaft 62 are slotted wheels 68 having a slit 70 formed therein. A portion of each slotted wheel 68 is positioned within a gap between the light emitting element and the light sensitive element of the photodetector 52. Also mounted to the rotatable drive shafts 62 are drive shaft spur gears 72 which engages the respective toothed spur gears 48 of the stepper motor 46. Secured to one end of each of the drive shafts 62 are flexible drive shaft couplings 74. Within the other end of the flexible couplings 74 are mounting members (not visible in this drawing) that hold the optical fibers 66 and 67 of the switch 20. Spring clamps 76 are mounted on the central pedestal 34 for hold the mounting members within offset V-grooves formed in the pedestal 34. The spring clamps 76 and the offset V-grooves form the holder assemblies for the mounting members, which will be described in greater detail below. The enclosed cavity 32 may be filled with an appropriate index matching fluid to reduce back reflections of the input light passing between the input fiber and output fiber. The index matching fluid also acts as a lubricant for the V-grooves and the bearings 58.

The housing 22, removable sidewall 38, and top plate 40 may be made of such materials as milled aluminum, stainless steel, or molded plastic. In the current design, these parts are milled aluminum. The rotating means in the form of the stepper motor 46 needs to achieve 0.14 degrees of rotational accuracy, be inexpensive, use relative little power and be small. An example of such a stepper motor 46 is manufactured and sold by HSI, Inc, Waterbury, Conn. under part number HSA33700. This particular stepper motor has an angular control specification to 0.09 degrees. A home position indicator is provided with the photodetector 52 and the slotted wheel 68 to provide a reference point at power on. The photodetector 52 may be any commonly available device, such as the Sharp GP1L01F manufactured and sold by Sharp Corp., Camus, Wash. that generates an electrical signal when light passes from the light emitting element to the light receiving element. The slotted wheel 68 may be made of any appropriate material having adequate rigidity and capable of having a narrow slot formed in it. In the preferred embodiment, the slotted wheel 68 is formed from a 1 mil polycarbonate film having a 0.001 inch slot 70 formed therein. The film is laminated onto an aluminum stiffening plate. As an alternative to the steppers motors 46, DC motors having high resolution encoders may be used. The ferrule drive shaft 62 may be formed of any appropriate material that is substantially rigid and resistant to wear. In the preferred embodiment, the rotatable drive shaft 62 is a stainless steel rod having an outside diameter of one-forth of an inch. The central bore 64 has a diameter of one-tenth of an inch.

Referring to FIG. 4, there is shown a perspective view of the mounting member drive system for the mechanical optical switch 20. The drive system includes input and output sections 80 and 82 which are essentially the same with the exception of the positioning of the optical fibers within the mounting member, which will be described in greater detail below in relation to ferrules 86. The elements of the output section 82 are essentially the same as the input section 80. The output section 82 has the rotatable drive shaft 62 on which is mounted the slotted wheel 68 and the drive shaft spur gear 72. The drive shaft 62 passes through seal plate 60, the flange shaft seal 94, and bearings 56 and 58. Attached to one end of the drive shaft 62 is the flexible drive shaft coupling 74. The flexible coupling 74 is provided to reduce the lateral torque being applied to the ferrules 86 during rotational movement, which would cause misalignment of the optical fibers in the switch 20. An appropriate flexible coupling may be obtained from Servometer Corp., Ceder Grove, N.J. under part number FC-9. Secured to the opposite end of the flexible coupling 74 is ferrule 86 contained in a ferrule assembly 88. Within each ferrule 86 are secured the optical fibers 66 and 67 of the switch 20, which are in intimate opposing relationship to each other. To maintain this relationship, clamp collars 96 are mounted on the ferrule drive shafts 62 on either side of the inner bearings 58 to compress the flexible coupling 74 to keep the end faces of the ferrules 86 in compression.

Figure 5:
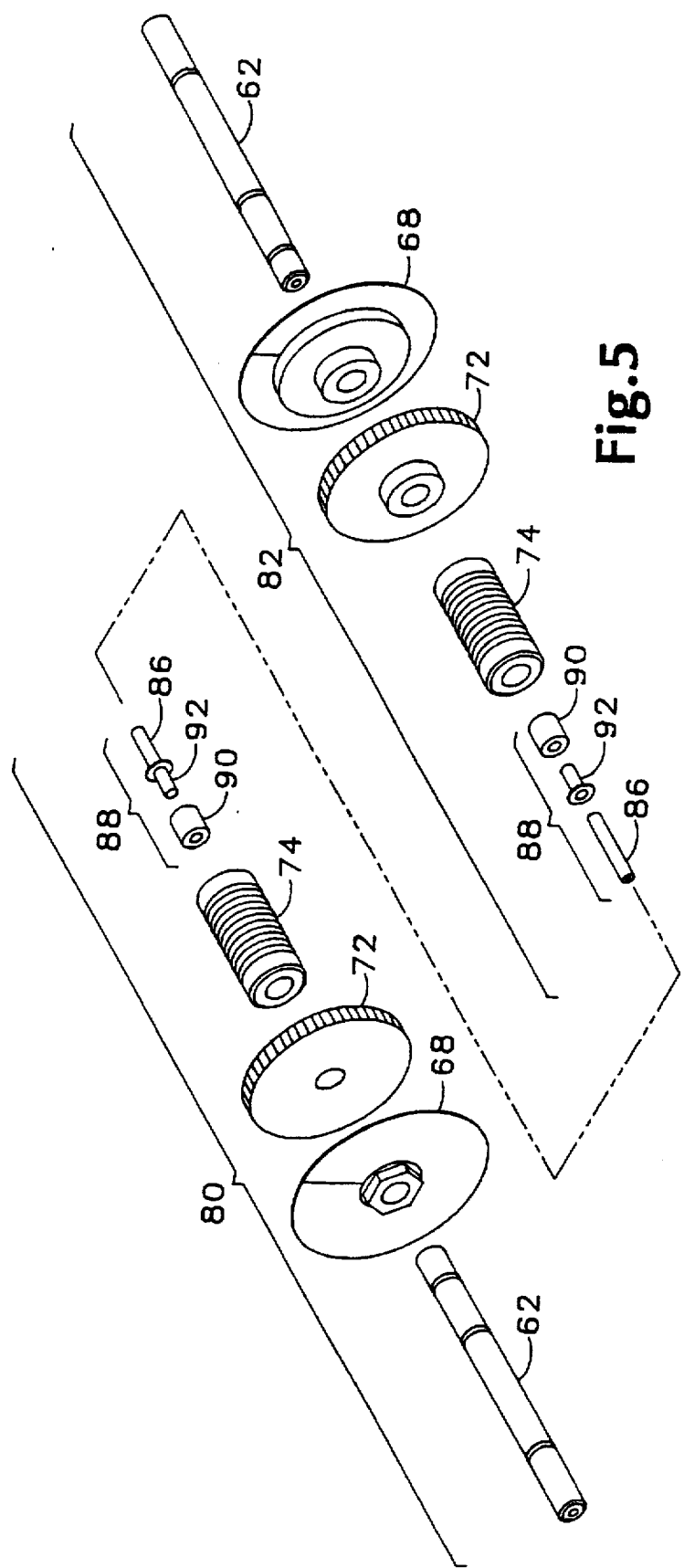
FIG. 5 is an exploded perspective view of the ferrule drive assembly in the mechanical optical switch used in the non-blocking N×N optical switch of the remote fiber test system according to the present invention.

Referring to FIG. 5, there is shown an exploded perspective view of the mounting member drive assembly. Elements in this figure are numbered the same as like elements in the previous figures. The ferrule assembly 88 consisting of a ferrule coupler 90 and the ferrule 86. In the preferred embodiment the ferrule coupler 90 is made of stainless steel but other suitable materials may be used. Alternately, a ferrule strain relief 92 may be secured within the ferrule coupler 90. A representative ferrule strain relief 90 may be purchases from Stimpson Co., Inc., Bayport, N.Y., under part number A3215. The ferrule 86 is secured in the ferrule coupler 90. The ferrule 86 is formed of a borosilicate industrial optics glass. A representative type of ferrule is the HC type manufactured and sold by Nippon Electric Glass, Des Plaines, Ill. This particular type of ferrule has an outside diameter tolerance of ±5 microns, an out of roundness specification of ±1 micron, and inside diameter tolerance of ±2 microns. As was previously described, using a ferrule with these tolerances in prior art optical switches would not provide the cycle-to-cycle repeatability, long, term repeatability, and absolute alignment required for a workable mechanical optical switch. However, applicant's mechanical optical switch 20 overcomes the mechanical tolerance problems of current mechanical optical switches by offsetting the ferrules 86 so as to rotate about independent axes instead of coaxially aligning and rotating the ferrules about a single axis as in the prior art.

Figure 6:
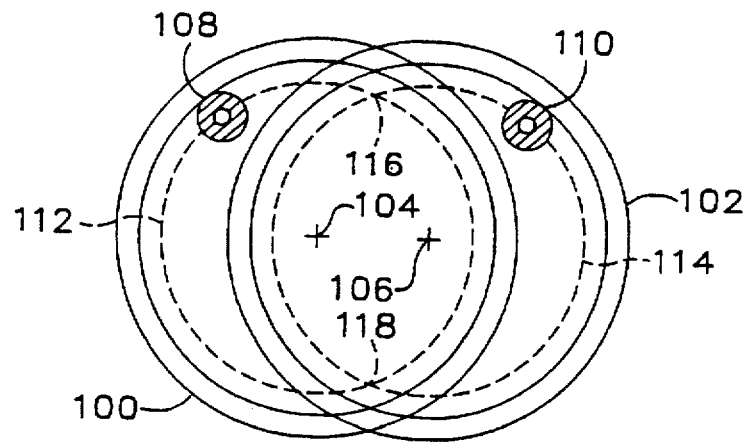
FIG. 6 is a diagrammatic representation of the offset ferrules in the mechanical optical switch used in the non-blocking N×N optical switch of the remote fiber test system according to the present invention.

Referring to FIG. 6, there is shown a representation of two opposing ferrules 100 and 102, rotating on independent axes 104 and 106, with each ferrule 100 and 102 containing an optical fiber 108 and 110 acting as an optical transmission path. In the preferred embodiment, the optical fibers are single-mode fibers having a core diameter of approximately 9 microns and an outside diameter of 125 microns. Other optical transmission paths may also be used, such as multimode optical fibers without departing from the scope of the invention. The opposing optical fibers 108 and 110 are positioned to move along closed curves 112 and 114 as the ferrules 100 and 102 are rotated. The close curves 112 and 114 intersect at points 116 and 118 on the respective curves. Assuming the curves 112 and 114 remain closed throughout the 360 degrees of rotation of the ferules 100 and 102, the intersection points 116 and 118 will be stable and will accurately represent the optimum alignment position for the two opposing fibers 108 and 110.

Figure 7A:
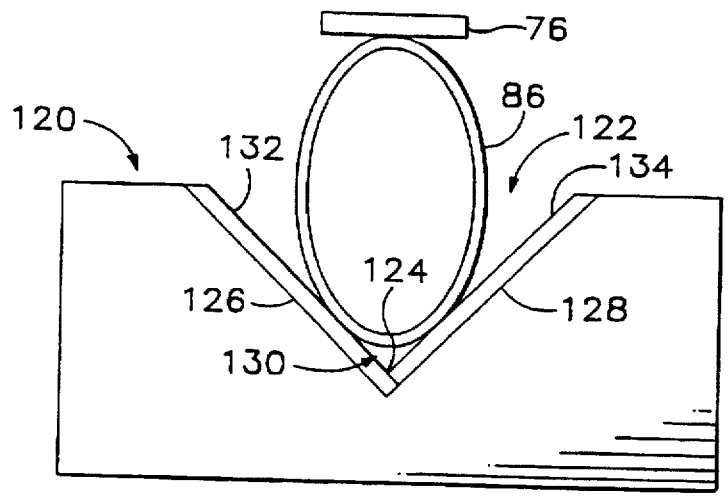
FIGS. 7A and 7B are end views of the kinematically correct holder assemblies in the mechanical optical switch used in the non-blocking N×N optical switch of the remote fiber test system according to the present invention.
Figure 7B:
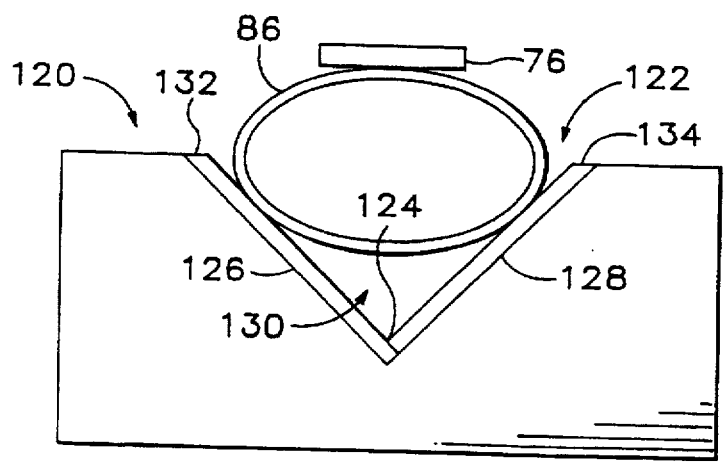

Referring to FIGS. 7A and 7B, there are shown end views of one of the two offset holder assemblies 120 formed or mounted on the pedestal 34 of the mechanical optical switch 20. Each holder assembly 120 has a V-groove structure 122 having an apex 124 and angularly extending sidewalls 126 and 128 forming a V-shaped cavity 130. Bonded to the sidewalls 126 and 128 are thin strips of wear resistant material 132 and 134, such as glass, ceramic, or the like. Configuring the holder assembly 120 in this manner allows the V-groove structure 122 to be formed from inexpensive materials, such as aluminum, plastic, or the like, while at the same time providing an extremely durable bearing. A more expensive, but possible design could use V-grooves made directly from the wear resistant material.

Ferrules 86, shown considerably out-of-round for illustrative purposes only, are respectively received in each of the V-groove cavities 130 formed on the pedestal 34. Spring clamps 76 are positioned over the cavities 130 to secure the ferrules 86 in the V-groove structures 122. The sidewalls 126 and 128 of each V-groove structure 122 provide two contact points for the ferrule 86 while the spring clamp 76 provides the third. This three-point mount is kinematically correct. A kinematic mount used in this specification means a mount with all forces resolved through a concurrent point. The retaining surfaces, the sidewalls 126 and 128 and the spring clamp 76, are tangent to the surface of the ferrule 86, resulting in a minimum energy configuration that is very stable, even when the ferrule 86 is not perfectly round. This compares to the prior art switches where the number of contact points is unknown, and varies from switch to switch, even during rotation. The spring clamp 76 in each holder assembly 120 is easily capable of small motion, so it can accommodate thermal expansion of the ferrule 86 or any out-of-roundness without slop (random movement) of the ferrule itself. Even if the ferrule 86 is considerably out-of-round the fibers inside the ferrule will still trace out closed curves. This eliminates any wobble caused by the dimensional variations between ferrules, as exhibited in prior art mechanical optical switches. It should be noted that the practice of this invention is not limited strictly to the V-groove structure and clamp configuration and other kinematically correct holder assemblies may be used without departing from the scope of the invention.

Bearing wear is a critical problem for any mechanical optical switch 20. The bearing wear on the V-groove structure 122 occurs along a small but finite Hertzian contact ellipse on each sidewall 126 and 128 surface. However, wear on the ferrule 86 occurs along its entire surface. Assuming the thickness of the material removed through wear is inversely proportional to the surface area of the bearing, the wear rates on the V-groove structure 122 should be hundreds or thousands of times greater than those of the ferrule 86. Bonding the wear resistant strips 132 and 134 to the sidewalls 126 and 128 reduces the wear on the V-groove structure 122. Additionally, control of the switch can be designed so, on the average, both ferrules 86 rotate the same number of degrees during any 100,000 cycles. This would in theory result in even wear rates for both V-groove bearings so that the ferrules 86 settle into the respective V-groove structures 122 by the same amount, thus preserving their relative alignment.

Figure 8:
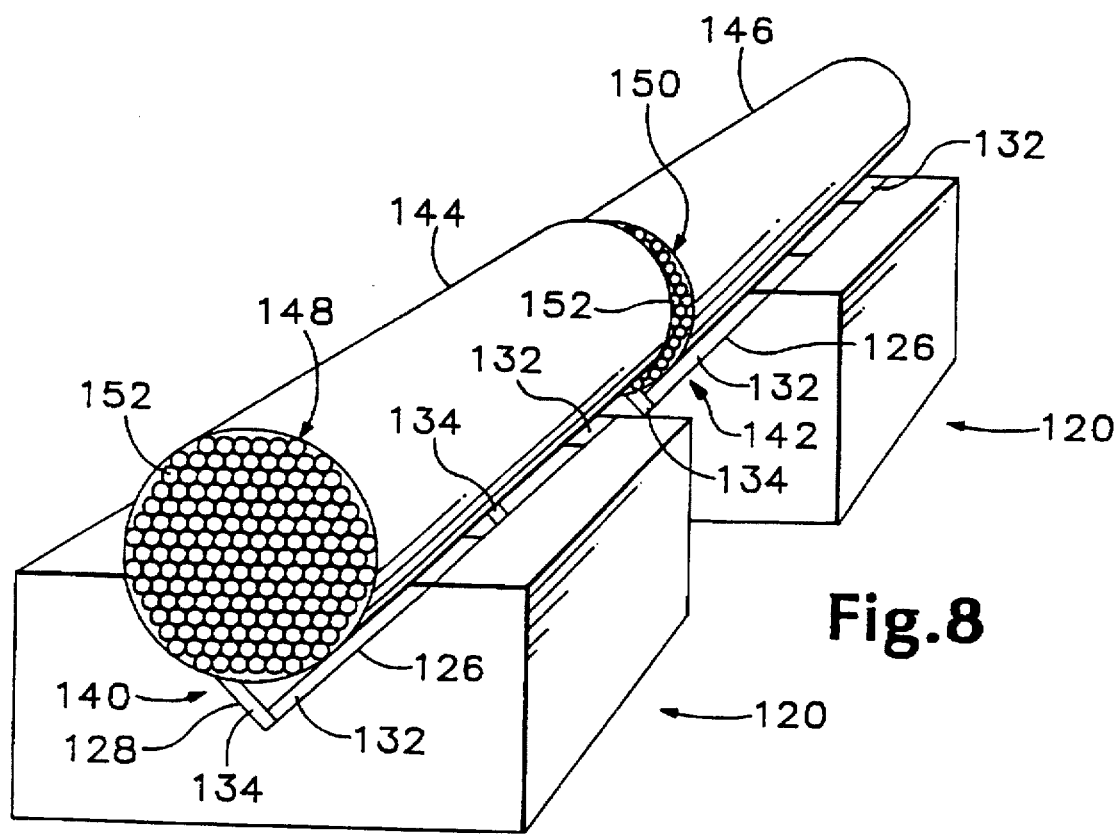
FIG. 8 is a simplified perspective of the offset input and output ferrules in the mechanical optical switch used in the non-blocking N×N optical switch of the remote fiber test system according to the present invention.

Referring to FIG. 8, there is shown a perspective view of the offset V-groove holder assemblies 120 formed on the pedestal 34 of the mechanical optical switch 20. Mounted in the V-grooves 140 and 142 are input and output ferrules 144 and 146 containing input and output optical fiber arrays 148 and 150. Each fiber array 148 and 150 may be formed of a single optical fiber 152 or multiple optical fibers. The outer walls of the ferrules 144 and 146 and the spring clamps 76 are not shown for clarity. The wear resistant strips 132 and 134 are shown in the currently preferred configuration where the separate wear resistant strips are bonded to the opposing ends of the sidewalls 126 and 128 of the V-grooves 140 forming a double ended bearing for the ferrules 144 and 146. The spring clamps 76, as shown in FIG. 3, are slotted to form first and second spring clamp members positioned over each set of wear resistant strips for securing the ferrules 144 and 146 in the V-groove cavity 130. Alternately, the wear resistant strips 132 and 134 may be configured to line the complete sides of the V-grooves 140. As is shown in the figure, the input ferrule 144 is slightly offset from the output ferrule 146. Because each ferrule 144 and 146 is highly constrained in its kinematically correct holder assembly 120, each fiber 152 of the input fiber array 148 traces out a closed curve when the input ferrule 144 rotates. These closed curves are approximately circles, but the actual shapes of the curves are not important. The curves could be ellipses, or any similar shaped closed curve. The same thing applies to the optical fibers 152 in the output fiber array 150. As was described with reference to FIG. 6, the closed curves of the optical fibers 152 in the input and output fiber arrays 148 and 150 are not concentric. That is any optical fiber 152 positioned to move on a closed curve in the input fiber array 148 will not be mirrored by any optical fiber 152 positioned to move on a closed curve in the output fiber array 150. The V-grooves 140 and 142 are deliberately offset in order to throw any input optical fiber closed curve out of concentricity with any output optical fiber closed curve.

Because the closed curves of the respective input and output optical fiber arrays 148 and 150 are not concentric, they intersect at exactly two points. It is because of this fact that optimal alignment is achieved between the optical fibers 152 of the input optical fiber array 148 and the optical fibers 152 of the output optical fiber array 150. Because there is no wobble or slop in the ferrule bearings, the kinematically correct holder assemblies 120, the curves are really closed, and because they are closed the angular coordinates of the intersection points are stable. This means that, for some angular coordinates of the input and output ferrules 144 and 146, an optical fiber 152 of the input fiber array 148 comes into perfect alignment with an optical fiber 152 of the output fiber array 150 at the intersection points. And, because the curves close, the angular coordinates are stable. They repeat over and over with extreme precision. Dynamically, if the trajectory of the system in phase space closes, then it is stable, periodic, and predictable. If the trajectory does not close, however, then the system can be chaotic.

Another important advantage is achieved by offsetting the input and output ferrules to rotate about independent and separate rotational axes. Each ferrules 144 and 146 may be loaded with any number of fibers 152. Some of the fibers 152 will be located about the edge of the inside diameter of the ferrules 144 and 146, and some will be located toward the center. By offsetting the ferrules 144 and 146, the closed curves scribed by the input fibers along the edge of the ferrule 144 can be made to intersect all of the output fibers of ferrule 146, even those that are located more toward the center. To do this, the offset between the two ferrules 144 and 146 should nominally be such that the closed curve traced out by the input fiber intersect the center of the output ferrule to within a tolerance of ½ the fiber diameter. In prior art designs, output fibers that are located near the center cannot be connected to input fiber that are on the edge. This means that an N×N switch can be built with more of its fibers concentrated toward the center than would be possible with prior art mechanical optical switches. This is an important advantage and objective of the invention because the angular tolerance required to achieve a given alignment decreases as the fibers move further from the center of the ferrule. So, when the fibers are far from the center of the ferrule, it requires more accurate angular resolution of the apparatus that rotates the ferrules. This would require, for example, the use of more expensive stepper motors 46 in the prior art designs whereas, in the present invention, less precise and therefore, less expensive stepper motors 46 can be used.

Another advantage and objective of the present invention is that the optical fibers 152 in the input and output optical fiber arrays 148 and 150 may be randomly configured in the input and output ferrules 144 and 146. That is, it is not necessary to arrange the fibers 152 in the array 148 and 150 in neat little patterns. Each fiber can follow its own closed curve. It make no difference to the operation of the switch, so long as the closed curves of all the input fibers 152 of the input fiber array 148 intersect the closed curves of all of the output fibers 152 of the output fiber array 150. Compare this design to the prior art where something is required to hold the fibers against the surface of the inside diameter of the ferrule or position the fibers on a concentric circle. Furthermore, that something must be very accurately dimensioned or the fibers will not be held tightly, and this will affect the concentricity, diameter, and roundness of the circles these fibers should travel.

An objective of the present invention is to produce a mechanical optical switch 20 that is easy to manufacture. As has been previously described, the mechanical optical switch 20 does not require precise positioning of the individual fibers 152 of the input and output fiber arrays 148 and 150 in the input and output ferrules 144 and 146 of the switch 20. The switch 20 of the present invention maybe configured as a 1×N switch having a single input port and multiple output ports or it may be configured as an N×N or N×M switch with multiple input ports and multiple output ports. In any configuration, the positioning of the optical fibers 152 is similar. In a 1×N switch, the input ferrule 144 is filled with optical fibers 152. Epoxy is added to the ferrule 144 to fill the voids between the fibers 152. All but one of the optical fibers 152 are then snipped at the end of the ferrule 144 leaving a single optical fiber 152 as the optical port. The same process is used for N×N and N×M optical switches with the exception that less or no fibers 152 are snipped. Likewise, the same process is used for producing the output ports for the switch 20. The important fact here is that no precise positioning of the fibers 152 within the ferrules 144 and 146 is necessary. This substantially reduces the manufacturing costs of the switch 20.

Alternately, a plug device may be used in forming the optical ports of the switch 20. The plug is positioned in the ferrules 144 and 146 and the fibers 152 are positioned between the plug and the inside wall of the ferrules. Epoxy is used to fill the ferrules 144 and 146. In either process, the ends of the ferrules 144 and 146 containing the fiber 152 are then ground and polished.

The input and output ferrules are then mounted in the holder assemblies 120 of the switch 20 and connected to the flexible couplings 74 of the ferrule drive system with the input and output fibers 66 and 67 (FIG. 3) passing through the central bores 64 of the ferrule drive shafts 62. It is worth noting that the assembly of the mechanical components of the switch is independent of the location of the optical fibers 152 in the input and output ferrules 144 and 146. As an example, the slotted wheels 68 are mounted on the ferrule drive shafts 62 without regard to the position of the fiber 152 within the ferrules 144 and 146. The positioning of the slots 70 in the wheels 68 to the photodetectors 52 establishes the starting reference points for the fibers 152 in their respective ferrules 144 and 146. The sidewall 38 is secured to the housing 22 and the cavity 32 is filled with an appropriate index matching fluid. The top plate 40 is secured to the housing and the switch 20 is ready for the alignment process.

Figure 9:
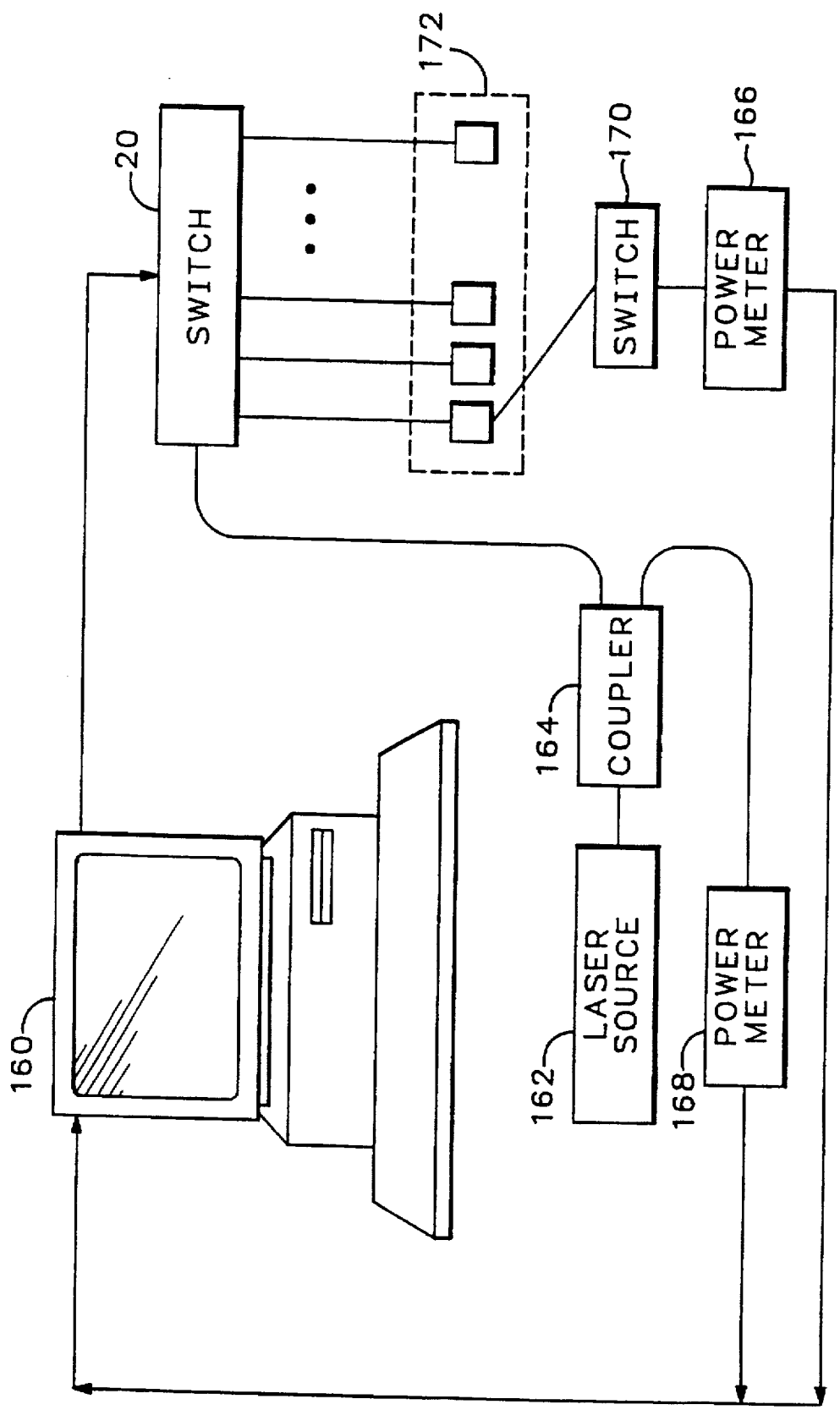
FIG. 9 is a representative alignment fixture for aligning the optical fibers of the input port with the optical fibers of the output port in the mechanical optical switch used in the non-blocking N×N optical switch of the remote fiber test system according to the present invention.

FIG. 9 shows an representative alignment fixture for determining the intersection points of the closed curves of the input optical fibers with the closed curves of the output optical fibers. It should be noted that any fiber 152 lying substantially on the axis of rotation of either of the ferrules 144 or 146 will not move on d closed curve but act as a point. For this reason, any fiber 152 on the axis of rotation of either of the ferrules 144 and 146 will not be used as an optical port. The alignment fixture has a controller 160, such as a computer, a laser source 162, either 1310 nm or 1550 nm, a single-mode coupler 164, two optical power meters 166 and 168, an electronic switch 170 and a bank of photodiodes 172. The computer 160 controls both the optical switch 20 and the electronic switch 170, and records the analog signals from the power meters 166 and 168. The computer locates the angular alignment coordinates of each port on the optical switch 20 by following a procedure as exemplified by the flow chart of FIG. 10. The threshold values in the procedure are not given since they may vary from fixture to fixture based on the laser light source used, the type of photodiodes employed and the type of power meters used.

Figure 11:
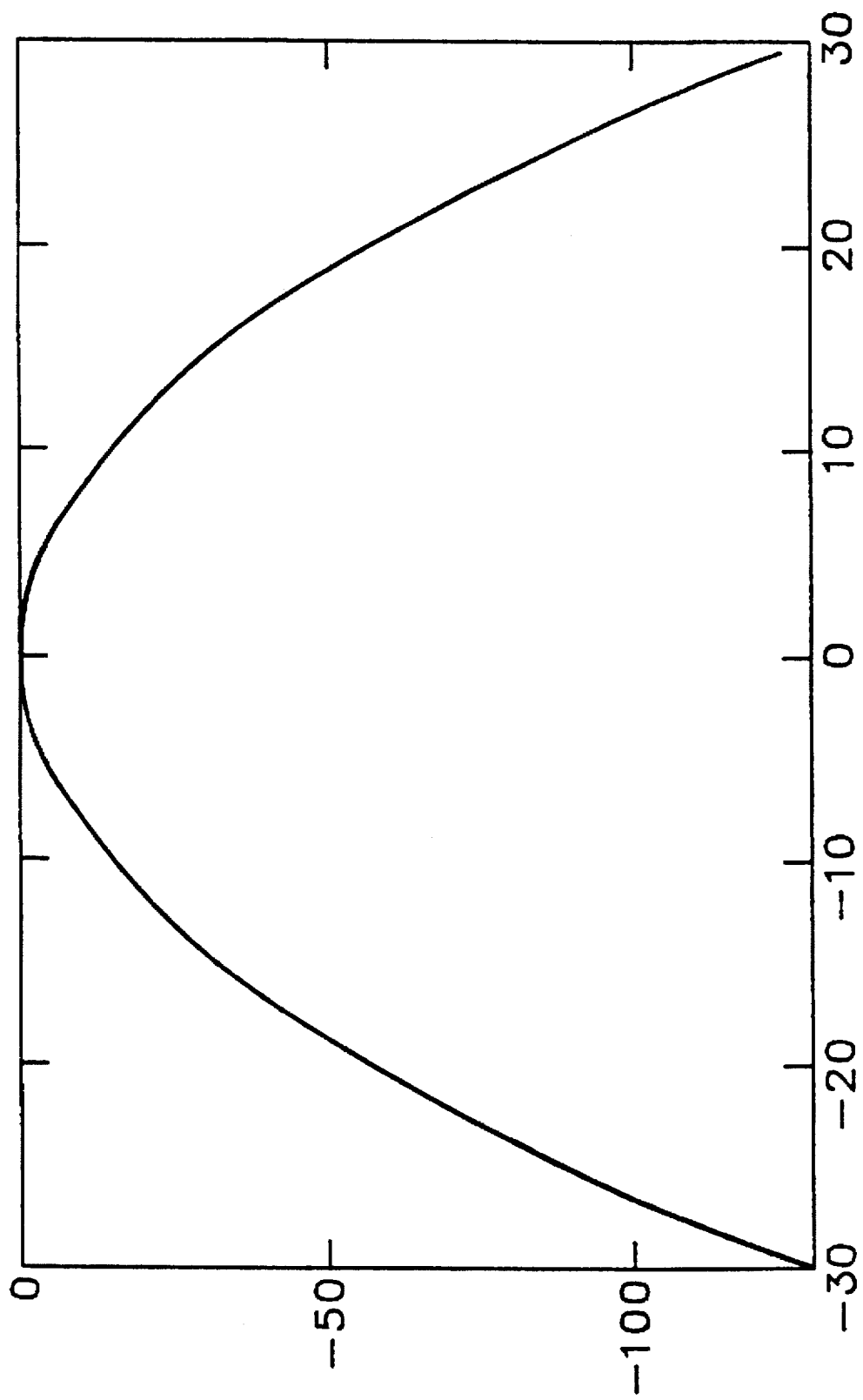
FIG. 11 is a graph representing a mathematical model for coupling between two misaligned optical fibers used in the alignment procedure for the optical ports in the mechanical optical switch used in the non-blocking N×N optical switch of the remote fiber test system according to the present invention.

The basic alignment procedure uses a mathematical model for coupling between two misaligned gaussian beams. This model is generally a good approximation for the optical transmission between misaligned single-mode fibers, since the fundamental modes of these fibers are nearly gaussian. The model assumes the two optical fibers are exactly identical, and that there is no longitudinal or angular misalignment between them. These assumption are valid since the ferrules 144 and 146 are ground and polished prior to installation in the switch 20 and clamp collars 96 are used to maintain the ferrules 144 and 146 in opposing contact. The mathematical model has previously been set forth in equation 1 where T is the optical transmission, x is the lateral offset between the two fibers and w is the $1/e^2$ radius of the irradiance profile of the fundamental mode. FIG. 11 illustrates this function plotted against a logarithmic scale. The function has a single maxima, obtained when the two fibers are exactly coaxial. The procedure locates this maxima by moving the first fiber, and then the second, in such a way as to maximize the optical transmission of the switch.

Figure 10A:
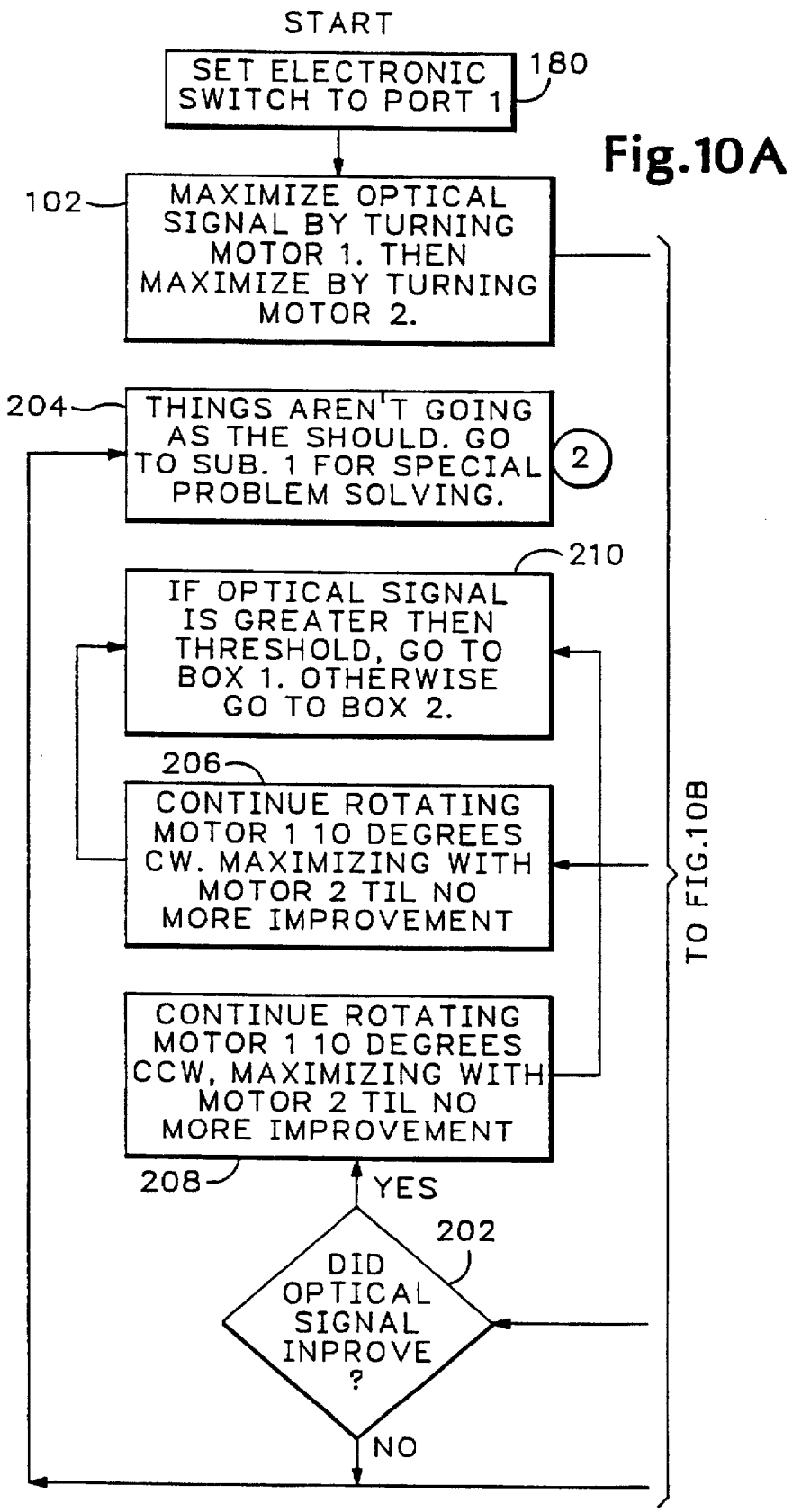
FIG. 10 is a typical flow chart of a procedure for aligning the optical fibers of the input port with the optical fibers of the output port in the mechanical optical switch used in the non-blocking N×N optical switch of the remote fiber test system according to the present invention.

For the smooth curve shown in FIG. 11, the iterative procedure in FIG. 10 steadily converges on the maxima, where the two fibers are in exact alignment. In the real world, however, the curve is lumpy below a certain level, so at low light levels the curve has local maxima that can fool the procedure. These local maxima are much lower, by 20 to 30 dB, than the global maxima, so the procedure must not align to them, or the switch's insertion loss will be to high. This is the reason the procedure makes large steps (either clockwise or counter-clockwise) when the transmission is below some predetermined threshold, which may be called Local Maxima Threshold, or LMT. These small local maxima are generally only a few degrees wide, so by searching with 5 or 10 degree steps the procedure avoids them, finding its way above the LMT, usually within 5 degrees of the global maxima.

Although a preliminary search with large steps greatly diminishes the danger of inadvertently aligning the switch to the local maxima, the procedure is not fool-proof. As an extra precaution, the procedure checks the absolute transmitted power before deciding whether or not the port is properly aligned. If the absolute power is too low, but cannot be improved by adjusting the two motors (using the smallest step increment) then either the switch has a defective component, or it is aligned to a local maxima. If this happens, the procedure employs a special problem solving subroutine, labeled 1 in flow chart of FIG. 10.

The problem solving subroutine will use information about how bad the transmission efficiency is, in order to conduct another search using increments that are larger than the stepper motor's smallest step, but smaller than 10 degrees. It is believed that the LMT can be adjusted so that these types if problems will be very rare, in which case the procedure may simply try to align another port, and leave the difficult ones for an experienced human operator.

When aligning switches with many ports, it may be impractical to try to align the ports sequentially. Instead, it may he simpler to examine each of the output ports, seeing which is closest to the input port by measuring the optical power at each of the photodiodes, and align that one first. After aligning the first port, the procedure could align the next closest port. Generally, this procedure will align the output ports out of sequence, but it will be faster, and the procedure can always renumber the ports after completing the alignment procedure.

The procedure starts with the controller 160 rotating the input and output ferrule drive shafts 62 to their home positions. Their home positions are electrical signals from the photodiodes 52 when the slots 70 of the slotted wheels 68 pass between the light emitting elements and the light receiving elements of the photodiodes. The procedure sets the electronic switch 170 to port 1, box 180, and rotates the input ferrule 144 to maximize the optical signal at the port 1 photodiode 172. The output ferrule 146 is then rotated to maximize the optical signal, box 182. If the optical signal is greater than the thresholds, box 184, then the optical signal is maximized again by sequentially rotating stepper motors 46 for the input and output ferrules 144 and 146 using the smallest step increments, boxes 186 and 188. These steps are repeated until the optical signal no longer increases, box 190. If the insertion loss is within specifications, box 192, then the port is aligned. The number of degrees each stepper motor 46 has turned from their respective home positions are stored in a memory located on the circuit board 42 mounted on the switch 20. The electronic switch 170 is set to the next port and the ferrules 144 and 146 are set to the home position, box 194, where the process is repeated for the next port, box 180.

If the optical signal is less than the threshold after the first motor turning, box 184, then the procedure turns motor 1 in the range of 10 degrees clockwise and maximizes the optical signal by turning motor 2, box 196. If the optical signal does not improve, motor 1 is turned in the range of 20 degrees counter-clockwise and motor 2 is turned to maximize the optical signal, box 200. If the optical signal improves after the approximately 10 degree clockwise rotation or the approximate 20 degree counter-clockwise rotation of motor 1 and the maximizing of the optical signal by turning motor 2, boxes 198 and 202, then the routine continues in the appropriate direction with maximizing the optical signal with motor 2, boxes 204 and 206. If the optical signal is greater than the threshold after this process, then the routine jumps to that portion of the procedure where motor 1 and 2 are turned using the smallest increment, boxes 186 and 188. If the optical signal is greater than the insertion loss, box 192, then the port is aligned, box 194, otherwise the routine jumps to the special problem solving routine, box 186. If after the clockwise and counter-clockwise rotations of the motors, the optical signal is less than the threshold, box 210, then the routine jumps to the special problem solving subroutine, box 186.

The procedure of FIG. 10 is designed to find one of the two intersecting points on the closed curves of the input and output optical fiber defining optical ports. The procedure could easily be modified to find both intersection points. This would be advantageous for faster switching between ports of the optical switch 20 in that the closest intersecting point of the designated ports could be more quickly accessed. Further, the procedure just described assumes a blind search, that is nothing is known about the locations of the fibers 152 within the ferrules 144 and 146. An improved apparatus for and method of aligning fibers within ferrules 144 and 146 is shown in FIGS. 12 through 18. The alignment fixturing consists of an analytical station 220, shown in FIG. 12 and a measurement alignment station 230, shown in FIG. 13. The analytical station 220 includes a light source 221, such as a frosted florescent light, and an optical microscope 222, such as manufactured and sold by Buehler and used for examining the ferrules of fiber-optic connectors. The microscope is used with a 5× objective in the alignment implementation of the present invention. Depending on the number of fibers 152 in the input and output ferrules 144 and 146, the objective may be larger or smaller. For example, a 10× or 20× objective may be used for a lower port count mechanical optical switch 20 whereas a 2× objective may be used for a high port count mechanical optical switch 20. A black and white CCD camera 223, such as Model No. KP-M1 manufactured and sold by Hitachi Denshi, Ltd. is coupled to the microscope 222. The output of the CCD camera 223 is coupled to a video monitor 224, such as manufactured and sold by Hitachi Denshi under Model No. VM920/VM921. The video monitor 224 output is coupled to a frame-grabber 225, such as Computer EYES LPT, Model CAT-100. The output of the frame grabber 225 is coupled to a computer 226 containing Compute EYES frame grabber software. The measurement alignment station 230 includes a solid state laser 231, such as a 1310 nm or 1550 nm laser used in telecommunications transmission equipment, power meters 232 and 233, such the Model TFC200 Optical Power Meter manufactured and sold by Tektronix, Inc., and a computer 234. The individual computers 226 and 234 may be connected together via a network or may be a single computer shared by both stations. Irrespective of the configuration of the individual computers 226 and 234, the data output of the analytical station 220 is used by the measurement alignment station 230 for aligning the opposing fibers 152 within the ferrules 144 and 146.

Figure 12:
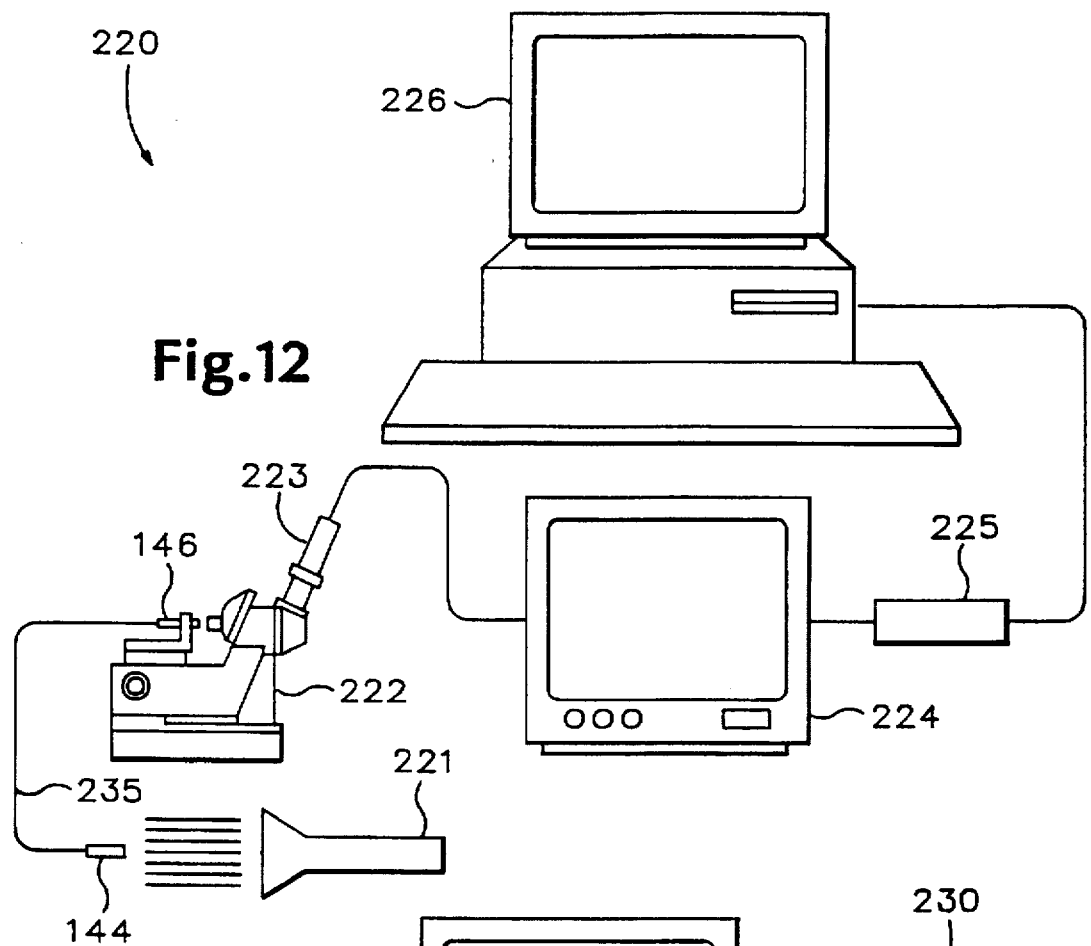
FIG. 12 is a representation of an analytical station of an alignment apparatus used for calibrating the mechanical optical switch used in the non-blocking N×N optical switch of the remote fiber test system according to the present invention.
Figure 13:
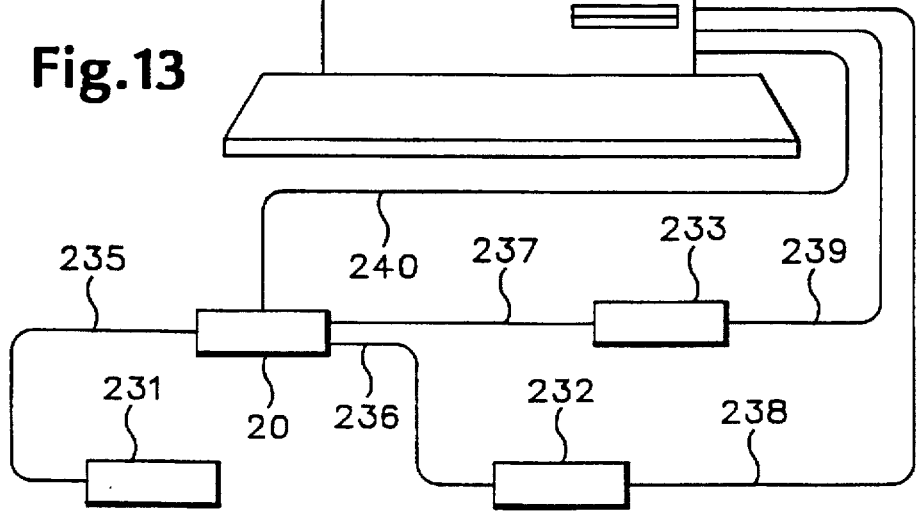
FIG. 13 is a representation of a mechanical alignment station of an alignment apparatus used for calibrating the mechanical optical switch used in the non-blocking N×N optical switch of the remote fiber test system according to the present invention.

The analytical station 220 acquires images of the respective end faces of the input and output ferrules 144 and 146 containing the optical fiber arrays 148 and 150 for determining the centers of each fiber 152 within the ferrules 144 and 146, the axes of rotation of the respective ferrules 144 and 146 and the angular alignment coordinates of each fiber 152 within the respective ferrules relative to a reference point within each ferrule. The reference point for each ferrule is a fixed point within the ferrule that is discernable in the acquired images. In the preferred embodiment of the alignment procedure, the reference point is a multimode fiber, referred to hereinafter as the reference port. A multimode fiber is chosen because it is substantially larger in diameter than the single-mode fibers and is readily identifiable in the imaged end faces of the ferrules 144 and 146. This makes it much easier to find and singularly identify the reference port than if it where a single-mode fiber. The need for consistent, even illumination across the fiber 152 cores for imaging affects the procedure for building the ferrules 144 and 146. The same fiber array or bundle 235 is used for both the input and output ferrules 144 and 146 with the ferrules located at opposite ends of the fiber bundle 235 as shown in FIG. 12. This allows easy illumination of the fiber 152 cores by simply pointing the opposite ferrule toward the diffuse light source 221. After scanning the ferrules' images into the computer, the fiber bundle 235 is cut in the middle to separate the two ferrule assemblies. The fiber bundle 235 consists of a number of single mode fibers and the multimode reference fiber. In a 1×N optical switch, all but one single-mode fiber is cut at the input ferrule 144. The measurement alignment station 230, operating under program control, selectively rotates the input and output ferrules of the assembled switch to optimally align the fiber or fibers 152 of the input optical fiber array 148 with the fibers of the output optical fiber array 150.

Figure 14A:
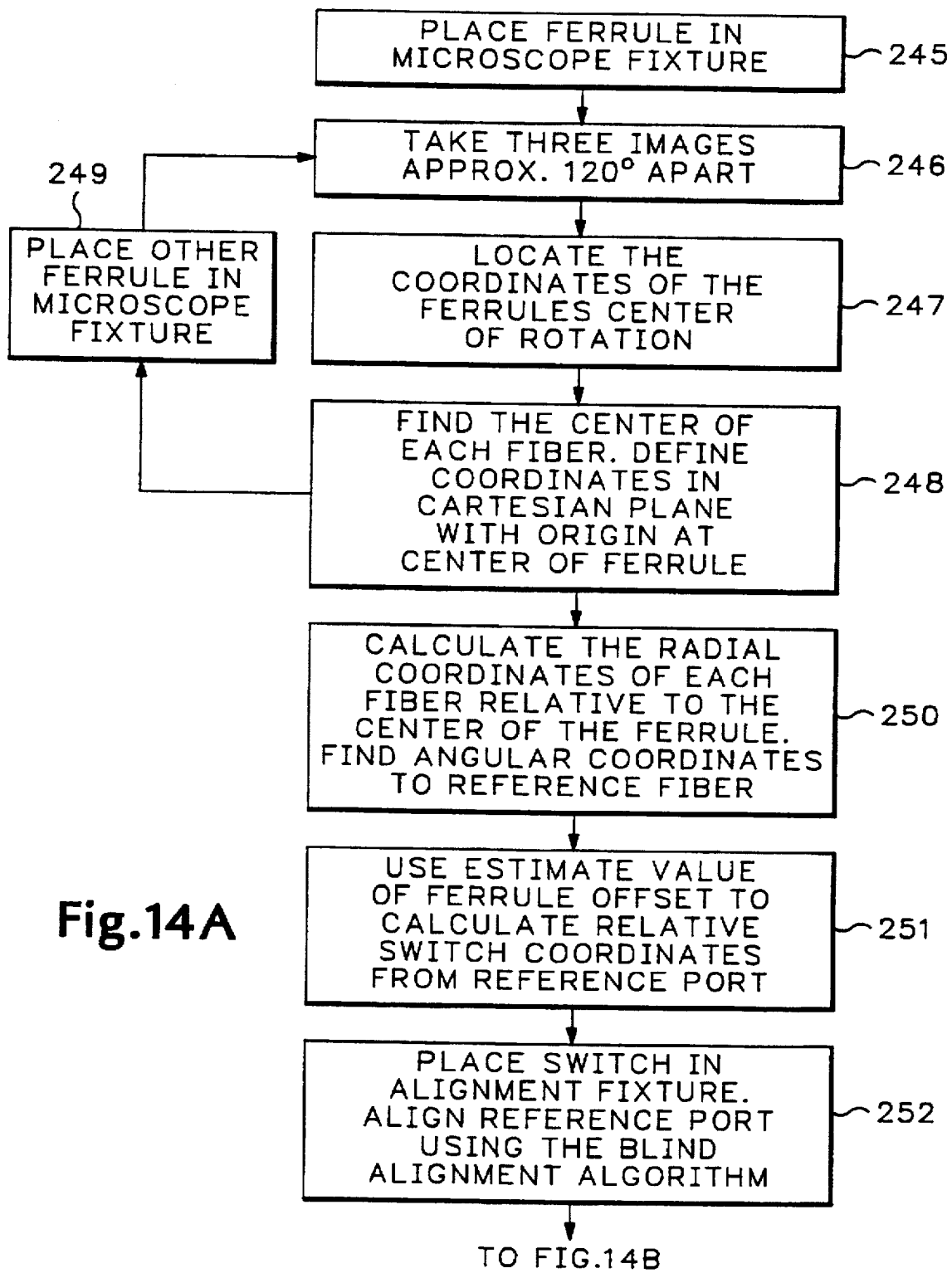
FIG. 14 is a flow chart of a procedure for determining the angular coordinates of intersecting points of opposing optical fibers of the input port and output port in the mechanical optical switch used in the non-blocking N×N optical switch of the remote fiber test system according to the present invention.
Figure 14B:
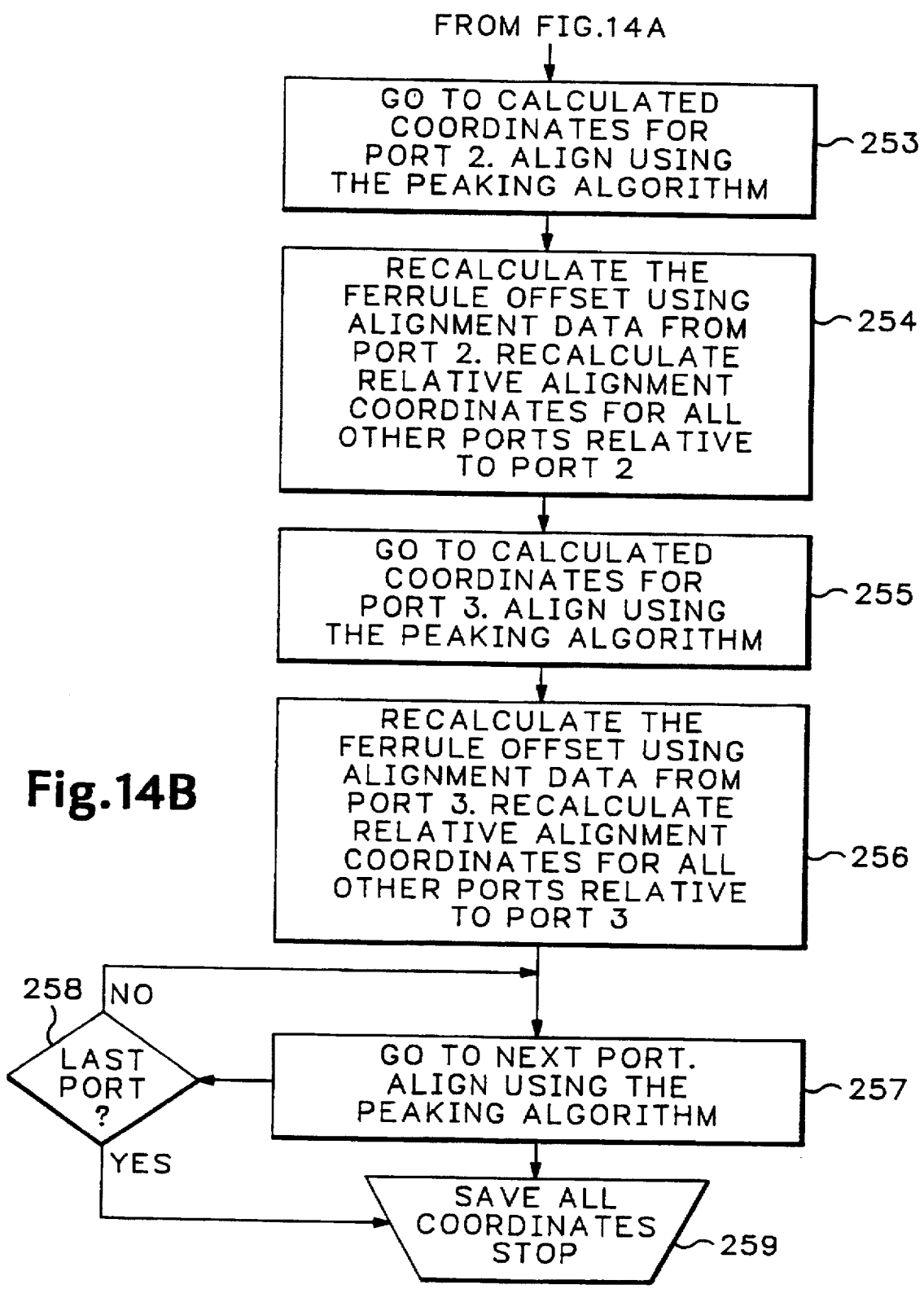

Referring to FIG. 14, there is shown a flow chart for aligning the fibers 152 of the input and output optical fiber arrays 148 and 150 disposed in the input and output ferrules 144 and 146 and for determining the angular coordinates for each aligned input fiber with an output fiber. The first step 245 of the procedure is to place one of the ferrules in a simple fixture, patterned after the V-groove structure of the switch, mounted on the microscope 222 stage. For explanation purposes, the output ferrule 146 is described below.

Figure 15:
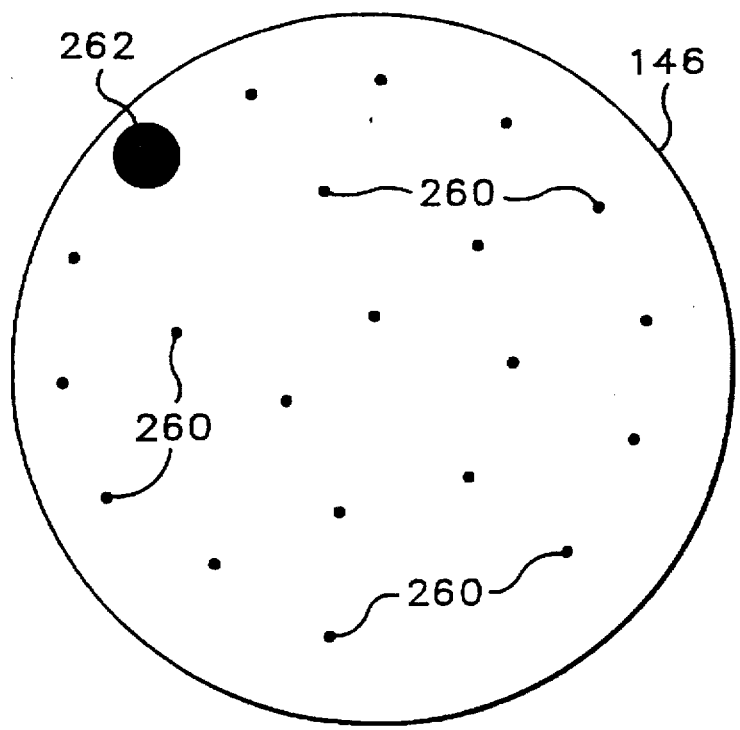
FIG. 15 is a representation of an inverted image of optical fibers in the output ferrule in the mechanical optical switch used in the non-blocking N×N optical switch of the remote fiber test system according to the present invention.

The next step 246 is to acquire three images of the ferrule, with each image at approximately one hundred and twenty degrees rotated from its position in previous image. The images are digitized and stored in the computer 226 for analysis. For example, the output ferrule 146 is imaged in the three orientations with the input ferrule 144 illuminated by the light source 221 and the microscope 222 light off. The acquired images are nearly binary, consisting of the illuminated cores of the fibers 152 on a black background. Because of the binary nature of the images, the fiber cores are relatively easy to find and accurately located. A typical location error is on the order of one-half of a pixel, or about one micron using a 5× objective in the microscope 222. FIG. 15 is an inverted image of the illuminated fibers 152 in the output ferrule 146. The small spots 262 are the illuminated cores of the single-mode fibers and the single large spot 262 is the illuminated core of the multimode reference port or fiber. A corresponding image of the input ferrule 144 for a N×N mechanical optical switch 20 would look similar to the output ferrule 146 image. An image of the input ferrule 144 in a 1×N mechanical optical switch 20 would show a single small spot for the single input fiber. Using rotated images of one of the fibers within the ferrules finds the true axis of rotation, even if the ferrule's inside and outside radii are not concentric. The only requirement imposed on the input and output ferrules' geometry is that the outside radius be approximately round.

The next step two steps 247 and 248 locate the center of each fiber and the coordinates of the ferrule's center of rotation. The alignment procedure locates the center of each ferrule by analyzing one of the stored images of the ferrule. The procedure compares each stored pixel to a threshold value. Any pixel value greater than the threshold is then compared to its eight neighboring pixel values to determine if it is greater than any of its eight neighboring pixels. If so, the average center of illumination is determined the region around the pixel equal to the fiber core size. The average center of illumination for each local maxima above the threshold value is stored as the coordinates of the fibers 152. The alignment procedure determines the true axis of rotation of the output ferrule 146 by analyzing the ferrule at different rotational orientations. The center of the multimode reference port 262 in the output ferrule 146 is determined for each of the three images and the center and radius of rotation is determined by solving the following three simultaneous equations:

$$(x_2-a)^2+(y_2-b)^2=r^2 \quad [5]$$

$$(x_3-a)^2+(y_3-b)^2=r^2 \quad [6]$$

$$(x_1-a)^2+(y_1-b)^2=r^2 \quad [4]$$

In these equations $(x_1,y_1)$, $(x_2,y_2)$, and $(x_3,y_3)$ are the coordinates of the fiber core in the three images, (a, b) is the coordinate of the center of rotation and r is the radius of rotation. The solutions are:

$$b = \frac{(x_3-x_2)(x_1^2-x_2^2+y_1^2-y_2^2)-(x_2-x_1)(x_2^2-x_3^2+y_2^2-y_3^2)}{2((x_2-x_1)(y_3-y_2)-(x_3-x_2)(y_2-y_1))} \quad [7]$$

The above equations locate the coordinates of the axis of rotation for the ferrule 146

$$r = \sqrt{(x_1-a)^2+(y_1-b)^2} \quad [9]$$

$$a = \frac{(x_2^2-x_1^2+y_2^2-y_1^2)+2(y_1-y_2)b}{2(x_2-x_1)} \quad [8]$$

and the image analysis determines the locations of each fiber 152 in the microscope's coordinate system for the output fiber array 150. A coordinate transformation determines the location of each fiber 152 in the output ferrule 146 in a coordinate system located on the rotation axis of the ferrule. Suppose that $x_{l_i}$ and $y_{l_i}$ are the coordinates of the i'th fiber in a general laboratory reference frame, while $x_{f_i}$ and $y_{f_i}$ represent their locations in a coordinate system centered on the ferrule's axis. Both coordinate systems are Cartesian, and their x and y axes are parallel. The coordinate transformation equations are:
where a and b represent the x and y coordinates of the center of the ferrule in the $$y_{f_i}=y_{l_i}-b \quad [11]$$

microscope's laboratory reference frame.

The next step 249 places the input ferrule 144 in the microscope 22 fixture. Three images of the end face of the input ferrules are acquired at three different rotational orientations and the three simultaneous equations are solved for (a,b) and r. The coordinates of the ferrule's axis of rotation is determined using either the multimode reference fiber 262 if the mechanical optical switch 20 is an N×N type switch or the single-mode input fiber if the switch 20 is a 1×N type switch. The $$x_{l_i}=x_{f_i}-a \quad [10]$$

track radius of the input fibers or fiber, or the distance from the rotational axis of the input ferrule 144 to the input fiber's core, is determined.

The next step 250 is to calculate the radial coordinates of each fiber core 260 relative to the center of the ferrule 146 and to calculate the relative change in alignment coordinates for each fiber relative to the reference fiber 262. The offset distance of the V-grooves, which in turn is the offset distance of the ferrules, is approximately known from the specifications of the switch or can be measured directly with a micrometer. In addition, a convention for positive and negative rotation of the ferrules is defined. Positive rotation is defined as a counter-clockwise rotation when looking at the optical interface of either ferrule. Negative rotation is defined as clockwise rotation. The positive x-axis and y-axis have their origins at the center of the output ferrule with the x-axis extending to the right and y-axis extending upward at ninety degrees to the x-axis. In this convention, when both ferrules are rotating through positive angles in their own coordinate systems they are counter-rotating at the optical interface because they face in opposite directions.

The radii of the tracks on which each of the output fibers rotates and the angle between the line joining each fiber to the x-axis is determined by the following equations (with angle in degrees):

$$r_i = \sqrt{(x_i^2+y_i^2)} \quad [12]$$

if $x_i > 0$ and $y_i > 0$ (points are in the first quadrant) $\quad [13]$ $$\theta_i = atan\left(\frac{y_i}{x_i}\right)$$

if $x_i < 0$ and $y_i > 0$ (points are in the second quadrant) $\quad [14]$ $$\theta_i = atan\left(\frac{y_i}{x_i}\right)+180$$

if $x_i < 0$ and $y_i < 0$ (points are in the third quadrant) $\quad [15]$ $$\theta_i = atan\left(\frac{y_i}{x_i}\right)+180$$

if $x_i > 0$ and $y_i < 0$ (points are in the fourth quadrant) $\quad [16]$ $$\theta_i = atan\left(\frac{y_i}{x_i}\right)+360$$

A further rotational transformation of the coordinates of the output fibers is performed so that the multimode reference fiber or port is positioned on the positive x-axis. The x-y coordinates of all the output single-mode fibers are calculated in this new reference frame. The same procedure is used for the input fibers in a N×N mechanical optical switch.

Figure 16:
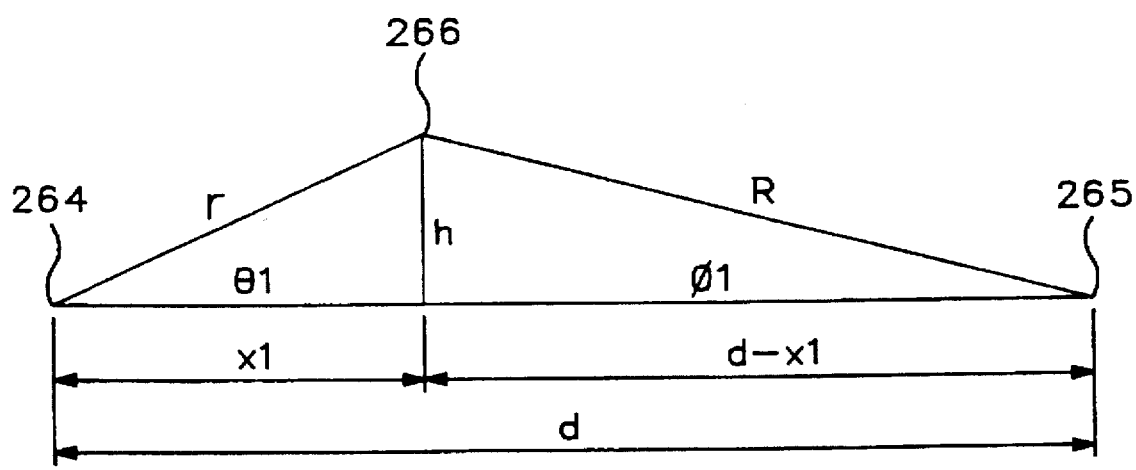
FIG. 16 is a representation of the alignment condition for an arbitrary input fiber in the mechanical optical switch used in the non-blocking N×N optical switch of the remote fiber test system according to the present invention.

The next step 251 uses the estimated value of the ferrule offset to calculate relative switch coordinates from the reference multimode port. FIG. 16 illustrates the alignment condition for an arbitrary input fiber. The distance between the centers of the two ferrules is the V-groove offset d when the ferrules having the same outside diameters. Ferrules of unequal diameters may be used without departing from the teaching of the invention. Points 264 and 265 are respectively the center of the output ferrule and the center of the input ferrule. Point 266 is the intersection point on the closed curves of the input fiber with one of the output fibers. From the geometry of triangles, the following equations are derived:

$$r \times \sin(\theta 1) = R \times \sin(\phi 1) \quad [17]$$

$$R \times \cos(\phi 1) = d - r \times \cos(\theta 1) \quad [18]$$

Solving equations 17 and 18:

$$\theta 1 = \frac{\pi}{2} - a\sin\left(\frac{d^2 - R^2 + r^2}{2dr}\right) \quad [19]$$

$$\phi 1 = a\sin\left(\frac{r \times \sin(\theta 1)}{R}\right) \quad [20]$$

Equations [19] and [20] give the alignment conditions for each fiber relative to the positive x-axis. Since each fiber's polar coordinates are known, the alignment coordinates for each fiber relative to the alignment coordinates of any other fiber can be calculated. The relative switch coordinates are passed to the measurement alignment station 230 where they are stored in computer 234 and used as the starting values for peaking the alignment of the input fibers or fiber with the output fibers.

Figure 17:
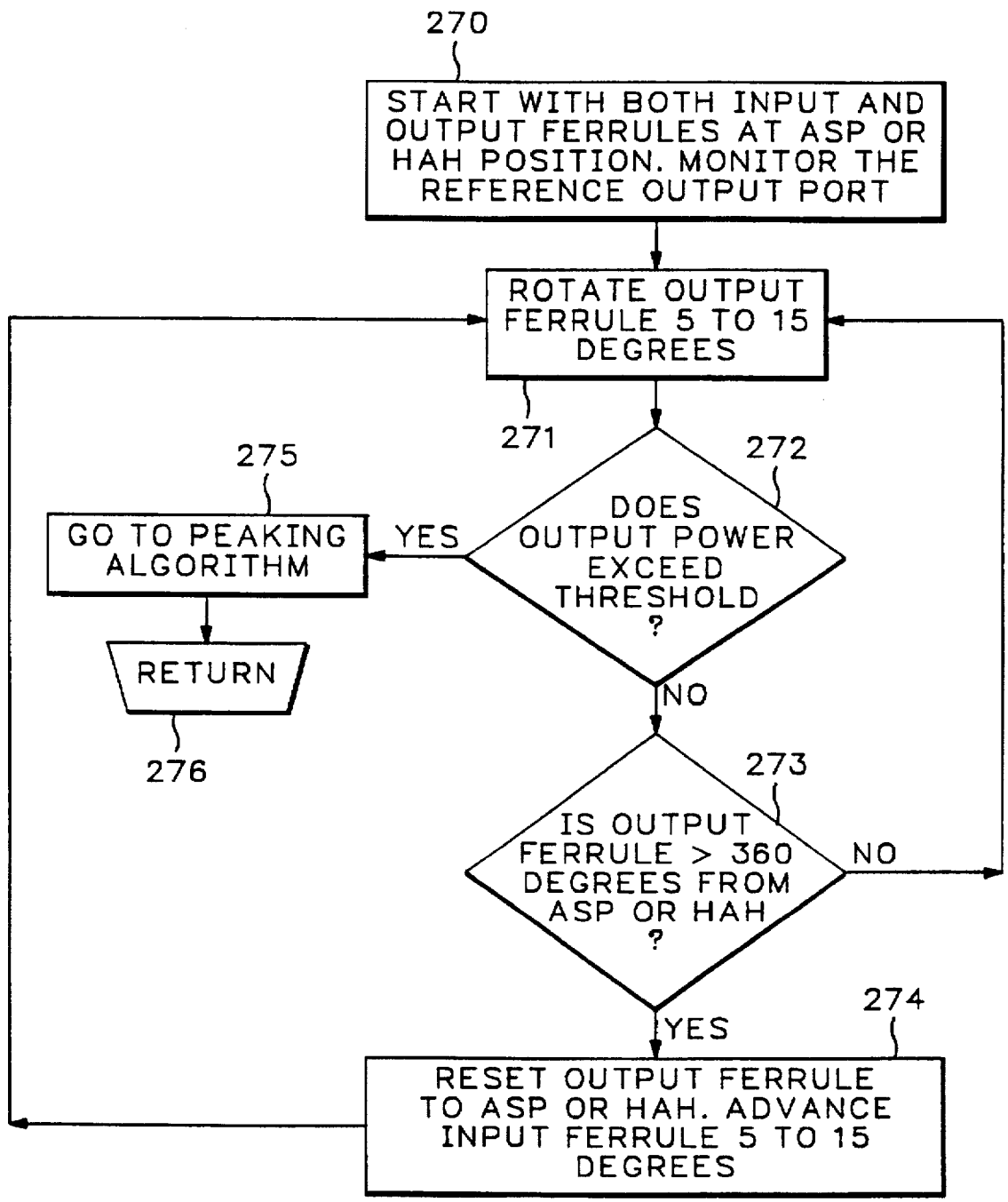
FIG. 17 is a flow chart of a blind search routine for locating a reference fiber in the mechanical optical switch used in the non-blocking N×N optical switch of the remote fiber test system according to the present invention.

As previously described, the fiber bundle 235 has the input and output ferrules 144 and 146 disposed at either end and contains the single-mode fibers and the multimode reference fiber and is cut in half after the alignment station steps. The ferrules are secured in the mounting members of the mechanical optical switch 20 and connected to the drive motors on the switch 20. The assembled switch is connected to the measurement alignment station 230 in step 252 with a laser source 231 coupled to the input single-mode fiber 235 as shown in FIG. 12. The single-mode fiber bundle 236 and the reference fiber 237 are respectively connected to the power meters 232 and 233. Power meter control cables 238 and 239 connect the power meters to the computer. A switch control cable 240 connects the optical switch to the computer. Step 252 further includes aligning the multimode reference port or fiber with the input single mode fiber using a blind search routine as shown in FIG. 17.

The input and output ferrules 144 and 146 are assembled in mechanical optical switch 20 without respect to the location of the reference port 262 and the input fiber to the home position sensors 52 of the switch 20. On initial power-up of the mechanical optical switch 20, the drive motors 46 coupled to each ferrule rotate to the home position defined by the sensors 52. The blind search routine may be initialized at this point to a Home-Away-From-Home position, which is one hundred and eighty degrees from the home position, but to speed-up the search an operator may manually control the motor rotation to position the input single-mode fiber and the reference fiber in the same quadrant. The blind search routine starts with both the input ferrule 144 and the output ferrule 144 at the arbitrary start position (ASP) or the Home-Away-From-Home (HAH) position, block 270. In the below description of the blind search routine, the degrees of rotation at each step are illustrative and may be adjusted for some steps as experience dictates. In addition, the degrees of rotation will be a function of the number of single-mode fibers in the output ferrule 146. Further, even though the routines describe degrees of rotation, the actual data saved for the angular coordinates of the aligned fibers is in motor steps. The output ferrule is rotated through five to fifteen degree of rotation in block 271 and the output optical power from the reference fiber is measured and compared to a threshold in decision block 272. If the optical power output does not exceed the threshold and the output ferrules has not exceeded 360 degrees of rotation from the ASP or HAH position as shown in decision block 273, then the routine loops back and rotates the output ferrule by another five to fifteen degrees of rotation, block 271. If the output ferrule has exceeded the 360 degrees of rotations, then the output ferrule is reset to the ASP or HAH position and the input ferrule is rotated by five to fifteen degrees of rotation as shown in block 274 and the output ferrules is again rotated by five to fifteen degrees, block 271. The input and output ferrules are rotated until the output power measured by the optical power meter exceeds the threshold whereupon a peaking routine is executed, block 275.

Figure 18A:
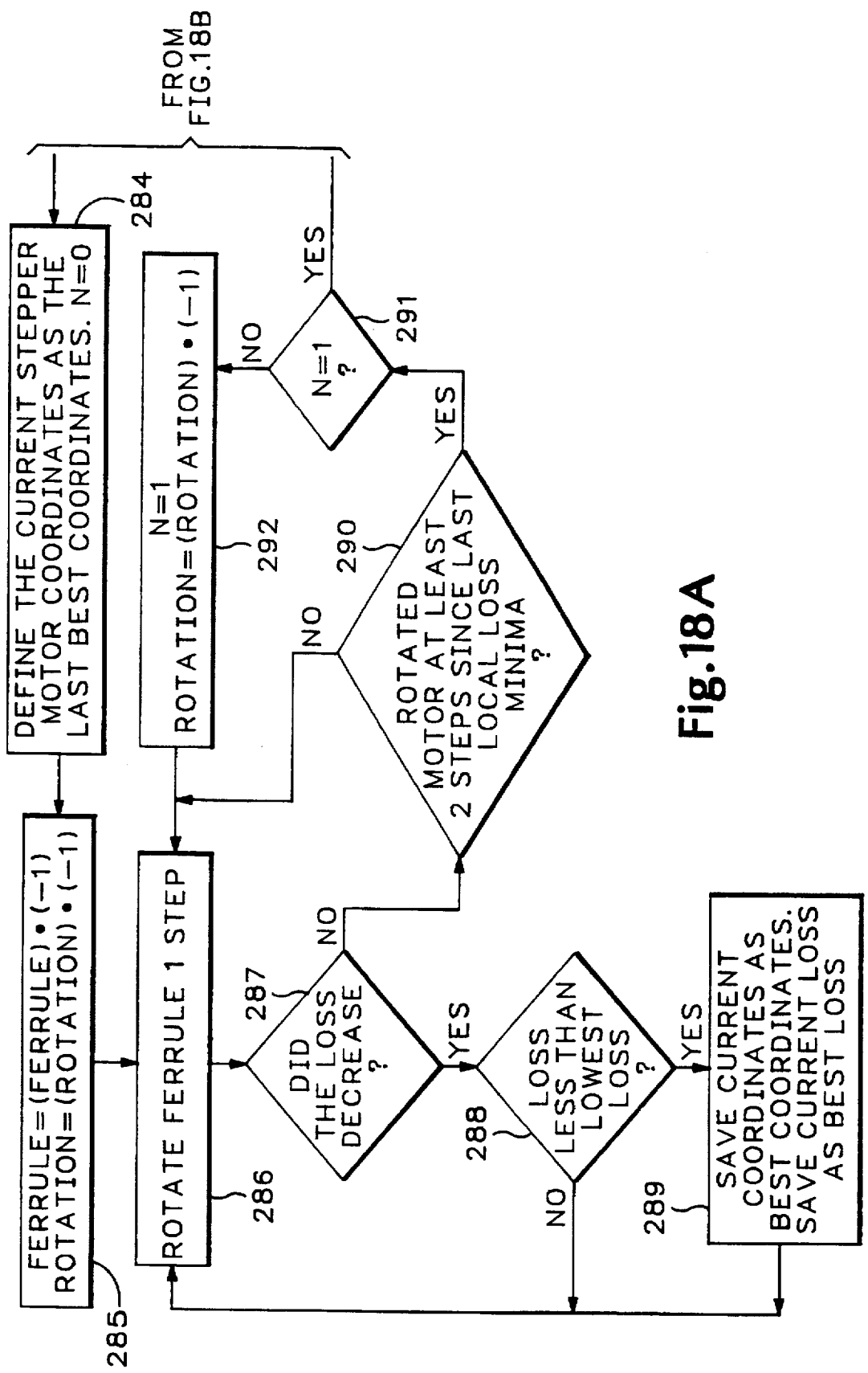
FIG. 18 is a flow chart for a peaking routine for optimizing the alignment of opposing fibers of the input port and output port and for returning the angular coordinates in the mechanical optical switch used in the non-blocking N×N optical switch of the remote fiber test system according to the present invention.
Figure 18B:
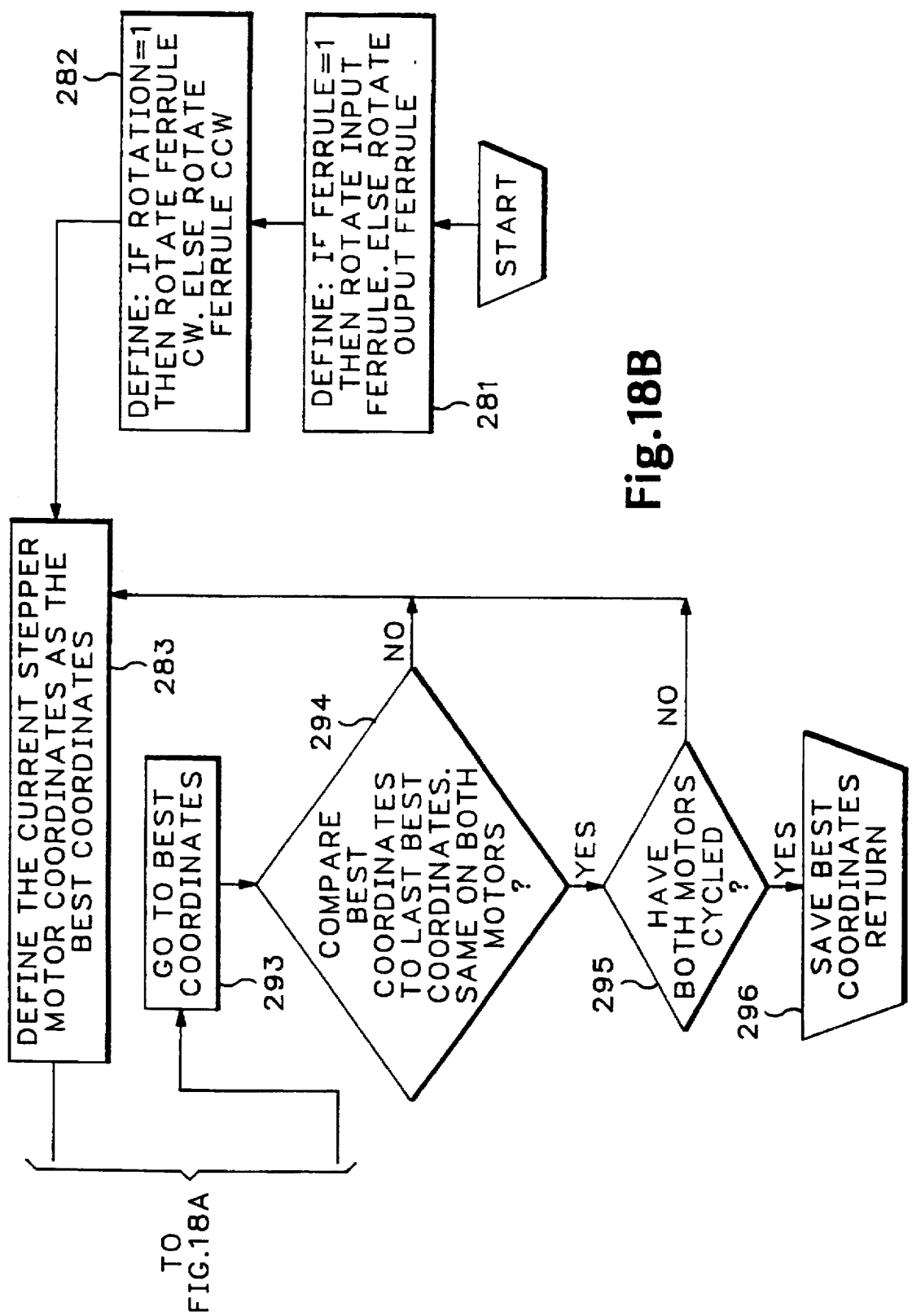

The peaking routine, shown in FIG. 18, starts by defining the input ferrule equal to one and clockwise rotation equal to one as shown in blocks 281 and 282. The current stepper motor coordinates are defined as the best coordinates as shown in block 282. The assumption is that there is some light coupled from the input fiber to the output fiber. The routine is initialized by defining the current stepper motor coordinates as the last best coordinates and setting a variable N to zero as shown in block 284. The routine initializes the ferrule to minus one and the rotation to minus one in block 285. That is, the output ferrule is rotated in a counter-clockwise direction on the first peaking pass. The routine starts with rotating the output ferrule in a counter-clockwise direction to determine the coordinates having the maximum amount of optical power coupled from the input fiber to the output fiber. The coordinates are saved as the best coordinates. These steps are shown in blocks 286 through 289. The routine continues past the best coordinates for two more steps, block 290, and then starts to rotate the output ferrule in a clockwise direction by setting N equal to one and the rotation equal to minus one, blocks 291 and 292. The routine determines the coordinates having the maximum amount of optical power coupled to the output fiber for the clockwise rotation of the output ferrule and saves the coordinates as the best coordinates, repeating blocks 286 through 289. With n equal to one the routine goes to the best coordinates, block 293, and compares the best coordinates to the last best coordinates, block 294. If they are not the same for both motors, the routine loops back through the routine, blocks 283 and 284 to redefine the current stepper motor coordinates as the best coordinates and the current stepper motor coordinates as the last best coordinates and reset N equal one. What has changed in the coordinates is the output ferrule stepper motor coordinate. The routine then switches to the input ferrule by setting the ferrule to a positive one (−1×−1=1), block 285. The input ferrule is rotated in both the counter-clockwise and clockwise direction to determine the best coordinate for the input ferrule, repeating blocks 286 through 292. After the best coordinate for the input ferrule is determined the routine compares the best coordinates to the last best coordinates, block 294, to determine if they are the same for both motors. If the result is yes, the routine determines if both motors have cycled, block 295. If the results yes, the best coordinates are saved as the optimum alignment positions for the input fiber and the selected output fiber, block 296. The routine then returns to the blind search routine or the routine that called it. The blind search routine then returns to the alignment routine. The number of steps from the home position of each stepper motor to the alignment point is saved as the coordinates of the intersection point.

The alignment routine proceeds to the coordinates for port number two, step 253, which is the first single-mode fiber, and uses the peaking routine previously described, to determines the optimum coordinates for maximum light throughput from the input fiber to the output fiber. The routine recalculates the ferrule offset using the alignment data from port two, step 254. Equation [19] gives $\theta 1$ as a function of r, d; and R. Although $\theta 1$ is not known, the change in $\theta 1$ is known as a function of aligning port two using the peaking routine. The change in $\theta 1$ is the difference between the calculated angular coordinate for port two and the alignment coordinate found using the peaking routine. The assumption is that the error is due to the estimate of the offset d, and as such the derivative of equation [19] can be used to estimate a correction factor for the offset. Using the correction factor, the value of offset d can be altered and new alignment coordinates can be recalculated for the fibers. This procedure may be followed each time a new port is aligned, until the changes in alignment coordinate falls below some preset threshold.

Taking the derivative of equation [15] with respect to d, rearranging, and replacing differentials with deltas:

$$\Delta d_i = \Delta\theta \times d_{est} \frac{\sqrt{(-d_{est}^4 + 2d_{est}^2(R^2 + r_i^2) - R^4 + r_i^2(2R^2 - r_i^2))}}{d_{est}^2 + R^2 - r_i^2} \quad [21]$$

The routines goes to the calculated coordinates for port three, step 255, and aligns $$d_{new} = d_{est} + \Delta d_i \quad [22]$$

the port with the input fiber using the peaking routine. The routine again recalculates the ferrule offset using the port three alignment coordinates and recalculates the relative alignment coordinates for all the other ports relative to port three, step 256. The routine goes to the next port and each succeeding port and aligns the fibers using the peaking routine, step 257. Each time a port is aligned the routine determines if it is the last port, step 258. When the last port has been aligned, the routine stops, step 259. The stored best coordinates for each of the aligned ports are read into memory circuits on the switch and stored. The switch 20 is now ready for use.

As has been previously described, the mechanical optical switch of the present invention may be configured with any number of input and output fibers or ports. The basic operation of the switch is to rotate the input or first optical fiber on its closed curve to one of the two intersecting points on its closed curve in response to the angular coordinate representative of the position of the fiber at the intersecting point matching the intersecting point of the second optical fiber. The output or second optical fiber is rotated on its closed curve to the intersecting point corresponding to the intersecting point of the first fiber in response to the angular coordinate representative of the position of the second fiber at the intersecting point. These rotational movements may be performed sequentially, but in the preferred embodiment they are performed simultaneously. Since the offset closed curves intersect at two unique points, the speed of the switch may be increased by selecting the intersecting points closest to the input and output fibers prior to rotating the fibers.

Testing has shown that one ferrule can move the other when it rotates in the same sense as the other, after the other ferrule has stopped rotating. To overcome this problem each fiber is rotated past the selected intersecting point by the same amount and then both are counter-rotated simultaneously and stopped at the same time at the intersecting point. Testing has also shown that one or both of the input or output rotating sections of the switch can continue turning their drive lines until the fiber break or the motors stall. The switch has been configured to generate an interrupt signal when either of the motors drive the drive line assemblies more than one or one and one/half times from their respective home positions. The reflectors or slotted wheels attached to the respective drive line assemblies pass light to the respective detectors at the home position. A user error code is generated when this condition occurs and the motors stops.

An invalid fiber or port request can be issued to the switch. For this reason, each input and output fiber or port selection is validated prior to rotating the input or output sections of the switch. Maximum limits are set for the input and output sections based on the number of fiber in the respective sections. If the fiber or port request exceeds the maximum limits, a user error code is generated and the sections remain stationary.

In switch configurations where the input and output sections have multiple fibers or ports, individual fibers are selected for either the input or output sections prior to rotating the sections. It is possible when selecting a new fiber or port for the maximum fiber or port position to be exceeded. To prevent this condition from damaging the switch, the angular coordinate to the intersecting point of a newly selected fiber or port is summed with the angular coordinate of the intersecting point of the previously selected fiber or port. The summed angular coordinate value is compared to a maximum range value and a user error code is generated when the summed angular coordinates exceed the maximum range value. The angular coordinates in the preferred embodiment are stored as steps of the stepper motor.

Referring to FIG. 19, there is shown a perspective view of an improved mechanical fiber optical switch 300 according to the present invention. Switch 300 has a housing 302 having a base 303, end walls 304 and 306 and sidewalls 308 and 310 forming a cavity 312. Disposed within the cavity 312 is a central pedestal 314 of similar design to the pedestal 34 in FIG. 3. Holder assemblies having a similar design to the holder assemblies in FIGS. 7A and 7B are formed in the pedestal 314. The holder assemblies include offset V-grooves and spring clamps for holding the mounting members 350. A recess 316 is formed in the top of the housing 302 for receiving a gasket (not shown). The gasket is secured in the recess 316 by a top plate (not shown), which is similar to the top plate 40 in FIG. 3. Like the switch 20 in FIG. 3 a circuit board (not shown) containing electronic circuitry is mounted on the switch housing 302. The cavity 314 is enclosed by the top plate and may be filled with an appropriate index matching fluid to reduce back refections of the input light passing between the input fibers 315 and output fibers 317.

Drive motors 318 and 320, such as stepper motors or DC motors with encoders, are secured to the sidewall 310 by motor clamps 322 and 324. Gear clamps 326 and 328 secure toothed spur gears 330 and 332 to the drive motor 318 and 320 shafts. Bores 334 and 336 (bore 336 being visible) are formed in the respective end walls 304 and 306 for receiving mounting member drive line assemblies 338 and 340. Mounted on the base 303 are detector brackets 342 and 344 for mounting reflective sensors 346 and 348, such as manufactured and sold by Honeywell, Inc., Minneapolis, Minn., under part number HOA1160.

The housing 302, the top plate, motor clamps and detector brackets may be made of the same material as the housing 22 in FIG. 3. In the improved design these parts are milled or formed aluminum. The drive motors 318 and 320 are stepper motors manufactured and sold by HSI, Inc. Waterbury, Conn., under part number 33755-01. The gear clamps 326 and 328 used in the current design are manufactured and sold by W. M. Berg, Inc., East Rockaway, N.Y. under part number CG1-25-A. The toothed spur gears are manufactured and sold by PIC Precision Industrial Components Corp., Middlebury, Conn. under part number H47-72.

Referring to FIG. 20 there is shown a plan view of the opposing mounting members and one of the two similarly designed mounting member drive lines 338 and 340. The mounting member drive line has a mounting member 350, such as a ferrule or the like, having one end coupled to a strain relief coupling 352. The other end of the mounting member 350 has a sleeve member 354 secured thereto, the purpose of which will be described in greater detail below. Coupled to the other end of the strain relief coupling 352 is a flexible drive shaft coupling 356, such as a flexible bellows manufactured by Servometer Corp., Ceder Grove, N.J., under part number FC-1. For use in the mechanical fiber optic switch of this design, the stock couplings of the bellows have been replaced and the interior bore has been enlarged. One end of the flexible drive shaft coupling 356 fits into the end of the strain relief coupling 352 and the other end fits over a drive shaft 358. The drive shaft is a stainless steel part, such as manufactured by PIC Precision Industrial Components Corp., Middlebury, Conn. under part number A3-23 or by W. M. Berg, Inc., East Rockaway, N.Y., under part number S4-23. Mounted on the drive shaft 358 is a retaining ring 360, such as manufactured by W. M. Burg, Inc. under part number Q7-25. Mounted on the drive shaft 358 next to the retaining ring 360 is an inner race spacer, such as manufactured by W. M. Berg, Inc., under part number SS2-32. Bearings 364 and 366, such as manufactured by W. M. Berg, Inc. under part number B1-31-Q3, are mounted on the drive shaft 358 next to the spacer 362. Positioned between the bearings 364 and 366 is a bearing spacer 368, such as manufactured by W. M. Berg, Inc. under part number SS2-65. Positioned on the drive shaft 358 adjacent to the bearing 366 is an outer race spacer 370, such as manufactured by W. M. Berg, Inc. under part number SS3-13, which is followed by another retaining ring 372, such as manufactured by W. M. Berg, Inc. under part number Q4-50. A seal 374, such as manufactured by Bal Seal Engineering Co., Inc., Santa Ana, Calif. under part number R315LB-202-SP-45, is positioned adjacent to the retaining ring 372. The end of the seal 374 opposite the retaining ring 372 has a flange 376, which fits into a recess formed in the outer surface of the end wails 304 and 306 and surrounds the apertures 334 and 336. A seal cover 378 having co-extensive apertures formed therein for receiving screws on the like. The seal cover 378 is secured to the outer surface of the end wails 304 and 306 with the screws for securing the seal 374 in the housing 302, co-extensive apertures formed therein for receiving screws or the like is positioned against the seal 374. Positioned on the drive shaft 358 adjacent to the seal cover 378 is a bearing 382, such as manufactured by W. M. Berg, Inc. under part number B1-31-Q3, and an inner race spacer 384, such as manufactured by W. M. Berg, Inc. under part number SS2-30. A toothed spur gear 386, similar to the gears 330 and 332, are mounted on the drive shaft 358 and secured thereto by gear clamp 388, similar to gear clamps 326 and 328. A reflector code wheel 390, or similar type of home positioning sensor, is mounted on the end of the drive shaft 358 in line with one of the reflective sensors 346 or 348. The improved simplified drive line has fewer coupling joints compared to the drive line in FIGS. 4 and 5. Further, ail couplings are either bonded with an epoxy, such as TRA-Bond BA-F230 epoxy or Epo-tek 353ND epoxy, or damped in place with a split-hub restraining device.

As previously described with regard to the mounting member ferrule 86, mounting member ferrule 350 may be formed of a borosilicate glass. Extensive testing of the mechanical fiber optic switch of the present invention has shown that the end-faces of the glass ferrules 350 were wearing against each other. This wear resulted in damaged fibers at the optical interface. Sometimes the fibers aim became contaminated by wear particles. The problem exhibited itself as a gradual, but sometimes erratic, increase in switch insertion loss. The cross-sectional view of FIG. 21 along line A–A' of FIG. 20 shows how the use of ceramic sleeves 354 resolved this problem. The ceramic sleeves 354, such as manufactured and sold by Mindurm Precision Products, Rancho Cucamonga, Calif., are epoxied to the end faces of the glass ferrules 350. The ferrule, populated with optical fibers, and the sleeves 354 are polished as a monolithic part. Since the ceramic is much harder than the glass, it polishes more slowly. This results in an under-polish 392, with the surface of the glass roughly 11–15 microns below the surface of the ceramic. Consequently, the glass ferrules do not tough at ail as representatively shown in FIG. 21. The ceramic sleeves keep the ferrules separated by about 25 microns. Additionally, since the ceramic wears much better than the glass, there are fewer wear particles to cause problems with contamination. An alternative to using ceramic sleeves with glass ferrules, is to replace the glass ferrules with ceramic ferrules, such as manufactured and sold by Rikei of America, Cupentino, Calif. Less under polishing of the fibers will occur with the ceramic ferrules but-this may be advantageous in slightly reducing the insertion loss due to less longitudinal misalignment. A preferred material for use in forming the ceramic sleeves 354 and the ceramic ferrules is zirconium oxide having a fracture toughness of 8 MPa*m^½.

Another problem discovered during the extensive testing of the mechanical fiber optic switch of the present invention was that the ferrules were differentially wearing into the V-grooves too fast, causing the switch to go out of alignment. This problem exhibited itself as a gradual increase in insertion loss, punctuated occasionally by sharp changes in the insertion loss. A solution to this problem is fining the V-grooves and the spring clamps with wear resistant ceramic inserts of zirconium oxide similar in composition to the ceramic sleeves 364 and ferrules 350.

A further embodiment of the mechanical optical switch 20 is to add a photodiode within the switch 20 proximate to the interface between the input and output fiber arrays 148 and 150. The photodiode monitors the amount of light scattered near the optical interface between the arrays 148 and 150 and generates an electrical output as a function of the misalignment of the various ports of the switch 20. A minimum electrical signal from the photodiode indicates the maximum alignment between the selected input and output ports. Including the photodiode in the mechanical optical switch 20 permits active alignment of the ports after it has been put in use. This can extend the useful life of the switch 20.

Figure 22:
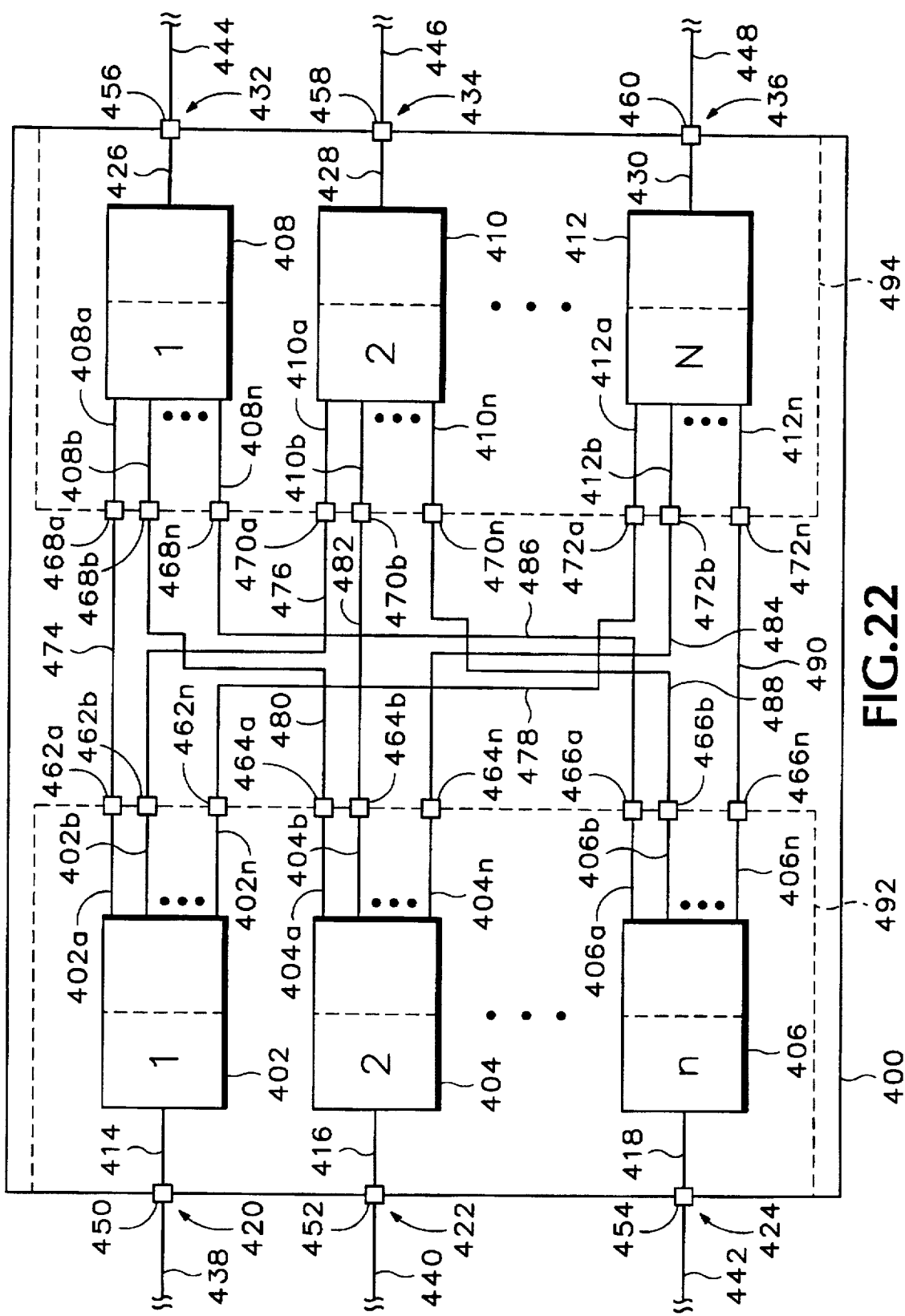
FIG. 22 is a representation of a non-blocking N×N optical switch using mechanical optical switches in the remote fiber test system according to the present invention.

The mechanical optical switch 20 or 300 may be used for coupling optical fibers together or for coupling a measurement test instrument to optical fibers. It may also be used in combination with other mechanical optical switches 20 or 300 for forming a non-blocking N×N optical switch as shown in FIG. 22. The non-blocking N×N optical switch 400 has a plurality of input mechanical optical switches 402, 404, 406 and a plurality of output mechanical optical switches 408, 410, 412. Each input mechanical optical switches 402, 404, 406 has an input optical transmission path 414, 416 and 418, such as optical fiber, representing one of the non-blocking optical switch input ports 420, 422 and 424. Each output mechanical optical switch 408, 410, 412 has an output optical transmission path 426, 428, 430, such as optical fiber, representing one of the non-blocking switch output ports 432, 434 and 436. The input and output ports 420, 422, 424, 432, 434 and 436 of the non-blocking optical switch 400 are generally coupled to optical transmission fibers 438, 440 442, 444, 446 and 448, such as included in optical fiber cables connecting central offices. Optical connectors 450, 452, 454, 456, 458 and 460 may be used to couple the optical transmission fibers 438–448 to the input and output ports 420, 422, 424, 432, 434 436 of the non-blocking optical switch 400.

The input mechanical optical switches 402, 404, 406 have N output optical transmission paths, respectively numbered 402a, 402b . . . 402n, 404a, 404b . . . 404n, 406a, 406b . . . 406n, such as optical fibers, where N equals the number of input or output ports of the non-blocking optical switch 400. The output mechanical optical switches 408, 410, 412 have N input optical transmission paths, respectively numbered 408a, 408b . . . 408n, 410a, 410b . . . 410n, 412a, 412b . . . 412n. Each output optical transmission path on a particular input mechanical optical switch is coupled to one of the input optical transmission paths of the output mechanical optical switches. For example, output optical transmission path 402a of input mechanical optical switch 402 is coupled to input optical transmission path 408a of output mechanical optical switch 408. Output optical transmission path 402b is coupled to input optical transmission path 410a and output optical transmission path 402n is coupled to input optical transmission path 412a. The output optical transmission paths of input mechanical optical switches 404 and 406 are likewise coupled to the input optical transmission paths of the output mechanical optical switches 408, 410 and 412. The interconnection of the various output and input optical transmission paths of the input and output mechanical optical switches allows any input port of the non-blocking optical switch 400 to be coupled to any output port of the switch 400. Optical connectors 462a, 462b . . . 462n, 464a, 464b . . . 464n, and 466a, 466b . . . 466n may be connected to the ends of the output optical transmission paths 402a, 402b . . . 402n, 404a, 404b . . . 404n, 406a, 406b . . . 406n of the input mechanical optical switches 402, 404 and 406. Likewise, optical connectors 468a, 468b . . . 468n, 470a, 470b . . . 470n, and 472a, 472b . . . 472n may be connected to the ends of the input optical transmission paths 408a, 408b . . . 408n, 410a, 410b . . . 410n, 412a, 412b . . . 412n of the output mechanical optical switches 408, 410 and 412. Interconnecting optical transmission paths 474, 476, 478, 480, 482, 484, 486, 488, and 490 may be provided for connecting the various output optical transmission paths 402a, 402b . . . 402n, 404a, 404b . . . 404n, 406a, 406b . . . 406n with the input optical transmission paths 408a, 408b . . . 408n, 410a, 410b . . . 410n, 412a, 412b . . . 412n. Each end of the interconnecting optical transmission paths 474–490 has a mating optical connector corresponding to the optical connectors on the input and output optical transmission paths 402a, 402b . . . 402n, 404a, 404b . . . 404n, 406a, 406b . . . 406n and 408a, 408b . . . 408n, 410a, 410b . . . 410n, 412a, 412b . . . 412n. This allows for easy configuring of the mechanical optical switches in the non-blocking optical switch 400. It further allows easy replacement of a defective mechanical optical switch.

The non-blocking N×N optical switch 400 may be used in optical switching equipment as is found in telephone company central offices or in any installation having a need for optical switching equipment. The non-blocking optical switch 400 is coupled to a controller, which provides commands to the switch 400 for controlling the individual mechanical optical switches 402–412. For example, the controller may issue commands for connecting input port 420 with output port 436. Input mechanical optical switch 402 is instructed to rotate the input optical transmission path 414 on its closed curve to the intersection point with the closed curve of the output optical transmission path 402n. Output mechanical optical switch 412 is instructed to rotate the output optical transmission path 430 on its closed curve to the intersection point with the closed curve of the input optical transmission path 412a. The completion of these rotations aligns input port 420 with output port 436. Likewise, any input port 420–424 can be connected to any of the output port 432–436 of the non-blocking optical switch 400.

The non-blocking N×N optical switch 400 has been described using individual input and output mechanical optical switches. Switch 400 may also be configured with input and output stages, respectively numbered 492 and 494, having N input mechanical optical switches and N output mechanical optical switches. The input stage 492 has N inputs and $N^2$ outputs and the output stage 494 has $N^2$ inputs and N outputs corresponding to the respective input and output optical transmission paths of the input and output mechanical optical switches. The N inputs and the N outputs of the input and output stages 492 and 494 respectively correspond to the input and output ports of the non-blocking switch 400. One advantage of having input and output switching stages is that the can be configured with a selected number N of mechanical optical switches. For example, the standard configuration for the input and output switching stages may be 4 mechanical optical switches. A single input stage combined with a single output stage would produce a non-blocking 4×4 optical switch.

Figure 23:
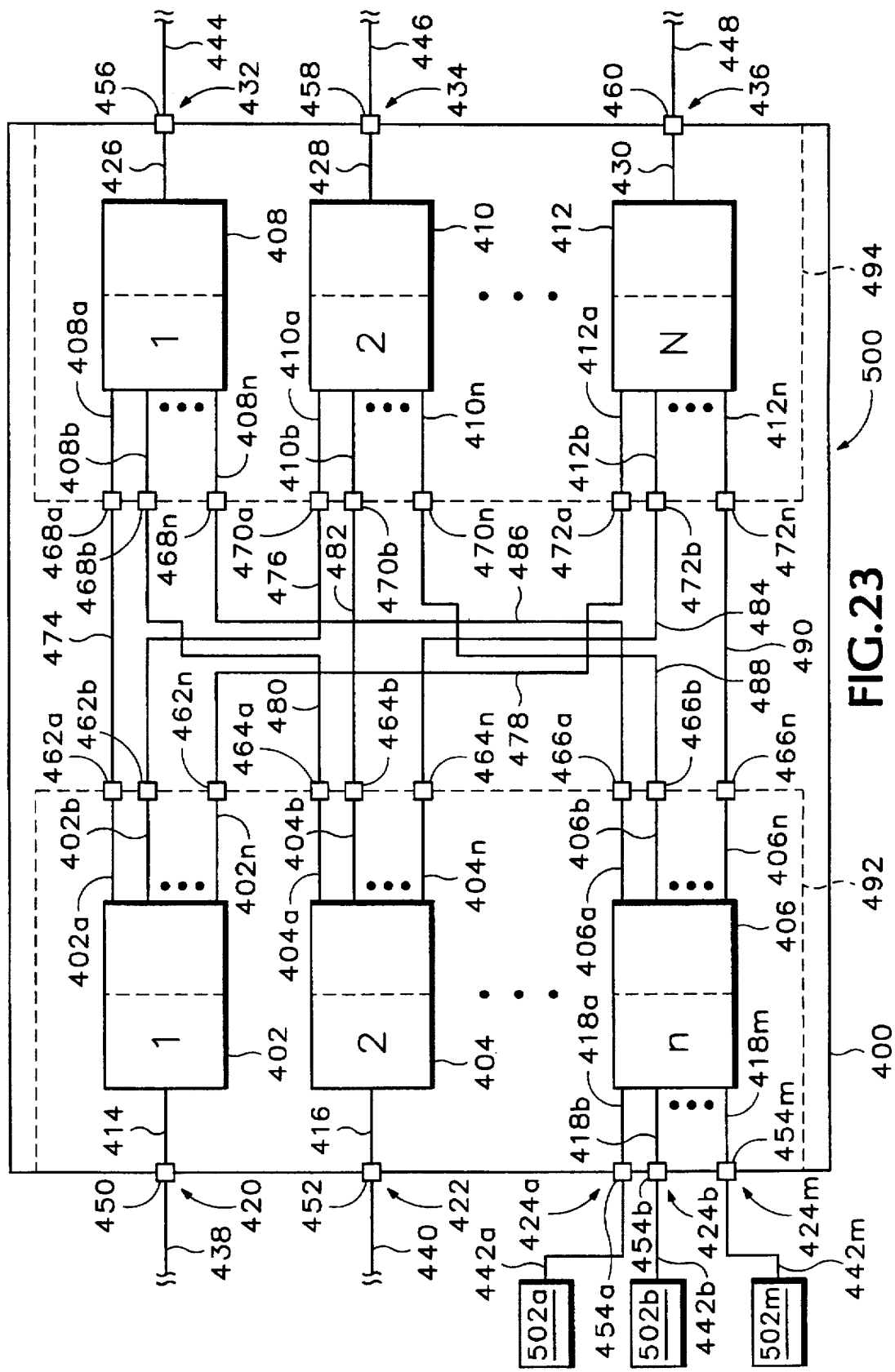
FIG. 23 is a representation of a remote fiber test system using a non-blocking N×N optical switch having mechanical optical switches according to the present invention.

Referring to FIG. 23, there is shown a remote fiber test system 500 using the non-blocking N×N optical switch 400. The numbering of like elements in FIG. 23 is the same as FIG. 22. The non-blocking switch 400 in the remote fiber test system 500 has one of its input ports, such as port 424, connected to a measurement test instrument 502a, 502b, or 502m, such as an optical time domain reflectometer, optical power meter, SONET test set or the like. In the FIG. 23, input port 424 is shown as having multiple inputs. The port may be configured with one input having a single piece of test equipment connected or it may be configured with m inputs having separate pieces of test equipment coupled to each of the m inputs. When configured with multiple inputs, the mechanical optical switch 406 has a plurality of m optical transmission paths rotating about its first independent and offset rotational axis for positioning the input optical transmission paths on first closed curves. These closed curves intersect the closed curves of the N output optical transmission paths of mechanical optical switch 406. As was previously described, any input port of the non-blocking switch 400 may be connected to any output port. This allows the measurement test equipment 502a, 502b, or 502m to be coupled to any of the output ports for testing the optical fibers connected thereto.

The remote fiber test system 500 may be used in optical switching equipment as is found in telephone company central offices or in any installation having a need for optical switching equipment. The measurement test equipment 502a, such as a TFP2A Optical Time Domain Reflectometer (OTDR) manufactured and sold by the assignee of the present invention, and the non-blocking optical switch 400 are coupled to a controller, which provides commands to the measurement test equipment and the switch 400 for controlling the OTDR and the individual mechanical optical switches 402–412. For example, the controller may issue commands for connecting input port 424 with output port 436. Input mechanical optical switch 424 is instructed to rotate the input optical transmission path 418 on its closed curve to the intersection point with the closed curve of the output optical transmission path 406a. Output mechanical optical switch 408 is instructed to rotate the output optical transmission path 426 on its closed curve to the intersection point with the closed curve of the input optical transmission path 408n. The completion of these rotations aligns input port 424 With output port 432. Likewise, input port 424 can be connected to any of the output port 432–436 of the non-blocking optical switch 400. The controller further issues commands to the OTDR for configuring the instrument to examine a portion or the complete length of the optical fiber 444 connected to output port 432 of the non-blocking switch 400. The OTDR examines the optical fiber 444 by launching optical pulses into the fiber and converting the return optical backscatter signal into an electrical signal and storing the results in instrument memory. The controller may further issues commands for retrieving the stored results from the OTDR for additional processing and comparison with previously stored results or for displaying on a display device, such as a display terminal or printed out from a printer, such as a Phaser 341 Color Printer, manufactured and sold by the assignees of the present invention.

A further embodiment of the remote fiber test system is providing a second non-blocking optical switch 400 at the opposite end of the optical fibers 444, 446 and 448. The optical fibers 444–448 are coupled to the input ports of the other non-blocking optical switch while one of the output ports is coupled to a measurement test equipment, such as a SONET test set. The SONET test set has a transmitting set for launching test data into the optical fiber and a receiver test set for receiving and analyzing the test data. The first the non-blocking optical switches 400 is configured to connect the SONET transmitting test set to the optical fiber to be tested, such as 444. The other non-blocking optical switch is configured to coupled port 424 to the coupled the SONET receiver test set to optical fiber 444. Controllers coupled to each test set configure the respective test sets to transmit and receive the signals. The controllers may also be coupled together to allow a single operator to control the operation of both test sets and both non-blocking optical switches.

The mechanical optical switch 20 of the present invention has been described using electrical stepper motors 46 for rotating input and output ferrules 144 and 146 to align the optical fibers 152 in the input and output optical fiber arrays 148 and 150 representing the input and output optical ports of the switch. It is also possible to practice the present invention using manual means for aligning the input and output optical ports. In such a switch, the stepper motors 46 and the toothed spur gears 48 are replaced with reduction gear assemblies. The reduction gear assemblies engage the ferrules drive shaft spur gears 72 on the ferrule drive shafts 62. A knob is provided for manually rotating the gear assembly and hence the ferrules 144 and 146 in the switch 20. Detents can be provided with the gear assembly to indicate alignment locations of the input and output ports. Alternately, alignment may be achieved by monitoring the appropriate output port for a maximum optical signal.

A mechanical optical switch has been described that meets cycle-to-cycle repeatability, long-term repeatability, and absolute misalignment specifications. The switch is inexpensive and easy to manufacture. The switch has offset ferrules that rotate about independent axes with the ferrules being held independently in separate three-point kinematically correct mounts, such as V-blocks. The V-blocks are lined with a wear-resistant material, such as glass or ceramic and lubricated with an index matching fluid. Offsetting the ferrules and mounting then in kinematically correct mounts allows the fibers held within the ferrules to trace out closed curves with the closed curves of the fibers in the input ferrule intersecting the closed curves of the fibers in the output ferrules. The input ferrule and the output ferrule are fully filled with fibers with all the fibers being accessible as ports with the exception of the fibers centered on the axes of the ferrules. Additionally, the ceramic sleeves are used to reduce the insertion loss between the input and output fibers over time by reducing the wear at the optical interface. Further, the optical switch is useable in a remote fiber test system for performing test on optical fiber links using optical measurement test equipment. These and other aspects of the present invention are set forth in the appended claims.

What is claimed is:

1. A remote fiber test system having at least a first measurement test instrument for testing optical fibers comprising:

a non-blocking N×N optical switch having N input ports and N output ports for selectively coupling any input port to any output port with one of the input ports coupled to the measurement test instrument and the output ports coupled to optical fibers, the non-blocking N×N optical switch including a plurality of N input and N output mechanical optical switches with each input mechanical optical switch having an input optical transmission path representing one of the input ports of the non-blocking optical switch and N output optical transmission paths and each output mechanical optical switch having N input optical transmission paths and an output optical transmission path representing one of the output ports of the non-blocking switch with each of the mechanical optical switches having first and second independent and offset rotational axes about which the respective optical transmission paths rotate with the optical transmission paths being held in respective first and second mounting members axially aligned with the respective first and second independent and offset rotational axes with the respective optical transmission paths being positioned off of the respective rotational axes of the mounting members;

the input mechanical optical switch having:
the input optical transmission path rotating about the first independent and offset rotational axis for positioning the input optical transmission path on a first closed curve and the N output optical transmission paths rotating about a second independent and offset rotational axis for positioning the output optical transmission paths on closed curves, the input optical transmission path and the output optical transmission paths being in opposing relationship forming an optical interface, with the closed curve of the input optical transmission path being laterally offset from the closed curves of the output optical transmission paths for establishing intersecting points on the offset closed curves with each optical transmission path of the output optical transmission paths being coupled to one of the N input optical transmission paths of each output mechanical optical switches;

and the output mechanical optical switches having:
the N input optical transmission paths rotating about the first independent and offset rotational axis for positioning the input optical transmission paths on first closed curves with each optical transmission path of the input optical transmission paths being coupled to one of the N output optical transmission paths of each input mechanical optical switches and the output optical transmission path rotating about the second independent and offset rotational axis for positioning the output optical transmission path on a closed curve, the input optical transmission paths and the output optical transmission path being in opposing relationship forming an optical interface, with the closed curves of the input optical transmission paths being laterally offset from the closed curve of the output optical transmission path for establishing intersecting points on the offset closed curves;

the input and output mechanical optical switches each having means for storing angular coordinates representative of the intersecting points on the offset closed curves of their input and output optical transmission paths and each having means for axially aligning their input and output optical transmission paths at one of the intersecting points on the offset closed curves using drive motors coupled to their respective mounting members and responsive to the angular coordinates for selectively rotating their input and output optical transmission paths relative to each other about their respective independent and offset rotational axes.

2. The remote fiber test system as recited in claim 1 wherein the non-blocking N×N optical switch further comprises interconnecting optical transmission paths coupled between the N output optical transmission paths and N input optical transmission paths of the respective input and output mechanical optical switches.

3. The remote fiber test system as recited in claim 2 wherein the non-blocking N×N optical switch further comprises optical connectors disposed on the N output optical transmission paths and N input optical transmission paths and the interconnecting optical transmission paths.

4. The remote fiber test system as recited in claim 1 wherein the non-blocking N×N optical switch further comprises optical connectors disposed on the input and output optical transmission paths of the respective input and output mechanical optical switches representing the respective input and output ports of the non-blocking N×N optical switch for coupling the measurement test instrument to one of the input optical transmission paths and optical fibers to the output optical transmission paths.

5. The remote fiber test system as recited in claim 1 wherein the measurement test instrument is an optical time domain reflectometer.

6. The remote fiber test system as recited in claim 1 wherein the measurement test instrument is an optical power meter.

7. The remote fiber test system as recited in claim 1 wherein at least one of the input mechanical optical switches of the non-blocking N×N optical switch further comprises a plurality of optical transmission paths rotating about the first independent and offset rotational axis for positioning the input optical transmission paths on first closed curves with each optical transmission paths being coupled to measurement test instruments.

8. The remote fiber test system as recited in claim 1 further comprising a second non-blocking N×N optical switch having N input ports and N output ports for selectively coupling any input port to any output port with one of the output ports coupled to another measurement test instrument and the input ports coupled to receive the optical fibers from the output ports of the first non-blocking optical switch.

9. The remote fiber test system as recited in claim 8 wherein the measurement test instruments are a SONET test set.

10. The remote fiber test system as recited in claim 1 wherein the non-blocking N×N optical switch further comprises first and second switching stages having N inputs and $N^2$ outputs with the first switching stage having the plurality of N input mechanical optical switches with the input optical transmission paths of the input mechanical optical switches being coupled to the N inputs of the first switching stage and the output optical transmission paths being coupled to the $N^2$ outputs of the first switching stage and the second switching stage having the plurality of N output mechanical optical switches with the input optical transmission paths of the output mechanical optical switches being coupled to the $N^2$ inputs of the second switching stage and output optical transmission paths being coupled to the N outputs of the second switching stage, the N inputs and N outputs of the respective first and second switching stages representing the input and output ports of the non-blocking N×N optical switch.

11. The remote fiber test system as recited in claim 10 wherein the non-blocking N×N optical switch further comprises interconnecting optical transmission paths coupled between the $N^2$ outputs and $N^2$ inputs of the respective first and second switching stages.

12. The remote fiber test system as recited in claim 11 wherein the non-blocking N×N optical switch further comprises optical connectors disposed on the $N^2$ outputs and $N^2$ inputs of the respective first and second switching stages and the interconnecting optical transmission paths.

13. The remote fiber test system as recited in claim 10 wherein the non-blocking N×N optical switch further comprises optical connectors disposed on the N inputs and N output of the respective first and second switching stages for coupling the measurement test instrument to one of the respective N inputs and the optical fibers to the N outputs representing the respective input and output ports of the non-blocking N×N optical switch.

14. The remote fiber test system as recited in claim 1 wherein each mechanical optical switch of the non-blocking N×N optical switch further comprises holder assemblies with each holder assembly having a kinematic mount for receiving one of the mounting members.

15. The remote fiber test system as recited in claim 14 wherein each kinematic mount of the mechanical optical switches of the non-blocking N×N optical switch comprises a V-groove structure having an apex and angularly extending sidewalls forming a V-shaped cavity for receiving one of the mounting members and a spring clamp positioned over the V-shaped cavity for securing the mounting member in the cavity.

16. The remote fiber test system as recited in claim 15 wherein the spring clamps of the mechanical optical switches of the non-blocking N×N optical switch further comprise first and second spring clamp members.

17. The remote fiber test system as recited in claim 16 wherein the mechanical optical switches of the non-blocking N×N optical switch further comprises wear resistant inserts secured to the spring clamp members.

18. The remote fiber test system as recited in claim 17 wherein the V-groove structures, the ware resistant spring inserts, and the mounting members of the mechanical optical switches of the non-blocking N×N optical switch comprise materials having substantially the same hardness and fracture toughness.

19. The remote fiber test system as recited in claim 17 wherein the V-groove structures and the wear resistant spring inserts of the mechanical optical switches of the non-blocking N×N optical switch of the non-blocking N×N optical switch comprise materials having a hardness and fracture toughness greater than the hardness and fracture toughness of the mounting members.

20. The remote fiber test system as recited in claim 19 wherein the wear resistant spring inserts and the V-groove structures of the mechanical optical switches of the non-blocking N×N optical switch comprise a ceramic material.

21. The remote fiber test system as recited in claim 20 wherein the ceramic material of the mechanical optical switches of the non-blocking N×N optical switch comprises zirconium oxide.

22. The remote fiber test system as recited in claim 19 wherein the mounting members of the mechanical optical switches of the non-blocking N×N optical switch comprise a borosilicate material.

23. The remote fiber test system as recited in claim 17 wherein the V-groove structures of the mechanical optical switches of the non-blocking N×N optical switch further comprise wear resistant inserts secured on the sidewalls of the V-groove structures.

24. The remote fiber test system as recited in claim 23 wherein the wear resistant V-groove inserts, the ware resistant spring inserts, and the mounting members of the mechanical optical switches of the non-blocking N×N optical switch comprise materials having substantially the same hardness and fracture toughness.

25. The remote fiber test system as recited in claim 23 wherein the wear resistant V-groove inserts and the ware resistant spring inserts of the mechanical optical switches of the non-blocking N×N optical switch comprise materials having a hardness and fracture toughness greater than the harness and fracture toughness of the mounting members.

26. The remote fiber test system as recited in claim 25 wherein the wear resistant V-groove inserts and the ware resistant spring clamp inserts of the mechanical optical switches of the non-blocking N×N optical switch comprise a ceramic material.

27. The remote fiber test system as recited in claim 26 wherein the ceramic material of the mechanical optical switches of the non-blocking N×N optical switch comprises zirconium oxide.

28. The remote fiber test system as recited in claim 25 wherein the mounting members of the mechanical optical switches of the non-blocking N×N optical switch comprise a borosilicate material.

29. The remote fiber test system as recited in claim 23 wherein the V-groove inserts of the mechanical optical switches of the non-blocking N×N optical switch further comprise wear resistant strips bonded to the opposing ends of the sidewalls for forming a double ended bearing for the mounting members.

30. The remote fiber test system as recited in claim 1 therein the mounting members of the mechanical optical switches of the non-blocking N×N optical switch comprise first and second ferrules with each ferrule having a centrally disposed longitudinal axis about which the ferrules rotate, an outside diameter and a central bore for receiving one of the input or output optical transmission paths, the optical transmission paths being positioned off of the axes of rotation of the ferrules.

31. The remote fiber test system as recited in claim 30 wherein the mechanical optical switches of the non-blocking N×N optical switch further comprises first and second sleeve members secured to the respective first and second ferrules at the optical interface with the sleeve members having a hardness and fracture toughness greater than the ferrules and the optical transmission paths for forming respective recessed polished end faces on the ferrules at the optical interface.

32. The remote fiber test system as recited in claim 31 wherein the first and second sleeve members of the mechanical optical switches of the non-blocking N×N optical switch comprise a ceramic material.

33. The remote fiber test system as recited in claim 32 wherein the ceramic material of the mechanical optical switches of the non-blocking N×N optical switch comprises zirconium oxide.

34. The remote fiber test system as recited in claim 1 wherein the mounting members of the mechanical optical switches of the non-blocking N×N optical switch comprise ferrules having a hardness and fracture toughness greater than the optical transmission paths for forming recessed polished end faces on the ferrule at the optical interface between the input and output optical transmission paths.

35. The remote fiber test system as recited in claim 34 wherein ferrules of the mechanical optical switches of the non-blocking N×N optical switch comprise a ceramic material.

36. The remote fiber test system as recited in claim 35 wherein the ceramic material of the mechanical optical switches of the non-blocking N×N optical switch comprises zirconium oxide.

37. The remote fiber test system as recited in claim 30 wherein the first and second optical transmission paths of the mechanical optical switches of the non-blocking N×N optical switch comprise optical fibers.

38. The remote fiber test system as recited in claim 37 wherein the N output optical fibers of the input mechanical optical switches and the N input optical fibers of the output mechanical optical switches completely fill the ferrule.

39. The remote fiber test system as recited in claim 1 wherein the drive motors of the mechanical optical switches of the non-blocking N×N optical switch comprise first and second stepper motors responsive to the angular coordinates of one of the intersecting points of the first and second closed curves for coupling rotational movement to the respective input and output optical transmission paths.

40. The remote fiber test system as recited in claim 1 wherein the drive motor of the mechanical optical switches of the non-blocking N×N optical switch comprise first and second DC motors with high resolution encoders responsive to the angular coordinates of one of the intersecting points of the first and second closed curves for coupling rotational movement to the respective input and output optical transmission paths.

41. The remote fiber test system as recited in claim 1 wherein the mechanical optical switches of the non-blocking N×N optical switch further comprises first and second rotatable shafts coupled to the respective mounting members with each rotatable shaft having a first spur gear mounted thereon for engaging a second spur gear mounted on each of the respective drive motors.

42. The remote fiber test system as recited in claim 41 wherein the mechanical optical switches of the non-blocking N×N optical switch further comprises first and second bearings having central bores therein for receiving the rotatable shafts.

43. The remote fiber test system as recited in claim 42 wherein the rotatable shafts of the mechanical optical switches of the non-blocking N×N optical switch further comprise a first shaft having a central bore for receiving the respective input and output optical transmission paths and a flexible drive shaft coupling for connecting the first shaft to the respective mounting members.

* * * * *